(12) United States Patent
Handa et al.

(10) Patent No.: US 7,881,176 B2
(45) Date of Patent: Feb. 1, 2011

(54) FLOATING LOCK DEVICE

(75) Inventors: Hiroto Handa, Tokyo (JP); Akira Takahashi, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 930 days.

(21) Appl. No.: 11/547,180

(22) PCT Filed: Mar. 31, 2005

(86) PCT No.: PCT/JP2005/006383

§ 371 (c)(1),
(2), (4) Date: May 16, 2007

(87) PCT Pub. No.: WO2005/096297

PCT Pub. Date: Oct. 13, 2005

(65) Prior Publication Data

US 2008/0019229 A1 Jan. 24, 2008

(30) Foreign Application Priority Data

Mar. 31, 2004 (JP) ............................. 2004-108427
Mar. 31, 2004 (JP) ............................. 2004-108452
Mar. 31, 2004 (JP) ............................. 2004-108467
Mar. 31, 2004 (JP) ............................. 2004-108475

(51) Int. Cl.
*G11B 17/26* (2006.01)
(52) U.S. Cl. .................... 369/247.1; 720/692
(58) Field of Classification Search ............... 369/30.81, 369/30.82, 30.85, 30.88, 30.89, 244.1, 247.1; 720/673, 690, 692, 713, 716
See application file for complete search history.

(56) References Cited

U.S. PATENT DOCUMENTS

| 5,335,218 | A  | * | 8/1994  | Osada ...................... 369/30.85 |
| 5,966,266 | A  |   | 10/1999 | Kato et al. |
| 6,222,816 | B1 | * | 4/2001  | Yoshida et al. .............. 720/651 |
| 6,370,105 | B1 |   | 4/2002  | Fujimoto |
| 2002/0024895 | A1 | | 2/2002 | Takizawa et al. |
| 2003/0095491 | A1 | * | 5/2003 | Adachi et al. .............. 369/77.1 |

FOREIGN PATENT DOCUMENTS

| EP | 0 936 609 | 8/1999 |
| EP | 1 041 552 | 10/2000 |
| JP | 06-282919 | 10/1994 |
| JP | 07-114789 | 5/1995 |
| JP | 10003731 | 1/1998 |
| JP | 10075588 | 3/1998 |

(Continued)

*Primary Examiner*—Craig A. Renner
*Assistant Examiner*—Tamara Ashford

(57) ABSTRACT

To provide a floating lock device which can smoothly and continuously perform an operation of swinging-in and swinging-out a drive unit and switching between a floating state and lock state with a reduced space and simple configuration. The floating lock device comprises: a pick arm 130 which can be swung into and swung out of a space created by splitting trays 250 capable of housing a plurality of disks D; a drive chassis 120 which is mounted on the pick arm 130 and which has a drive unit playing the disk D; a drive mechanism which drives the pick arm 130; a floating lock mechanism of the drive chassis 120; a turning table 123 on which the disk D is mounted; and a control plate 136 which transmits drive power of the drive mechanism to the floating lock mechanism.

19 Claims, 24 Drawing Sheets

FOREIGN PATENT DOCUMENTS

| | | |
|---|---|---|
| JP | 11-096633 | 4/1999 |
| JP | 11-232753 | 8/1999 |
| JP | 11-306637 | 11/1999 |
| JP | 2000-048465 | 2/2000 |
| JP | 2000-195134 | 7/2000 |
| JP | 2000-285565 | 10/2000 |

* cited by examiner (A)          (B)

(A)   (B)

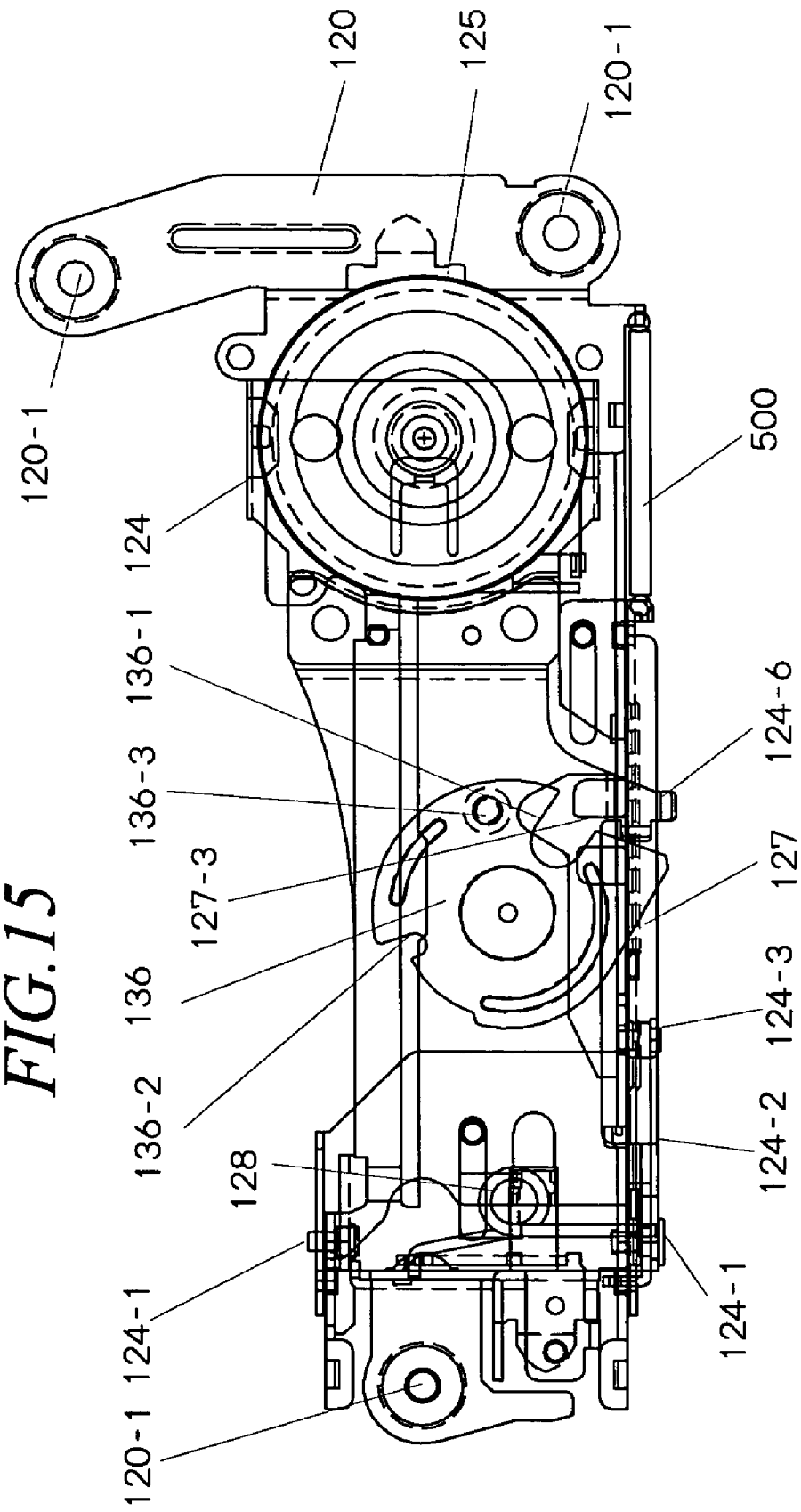

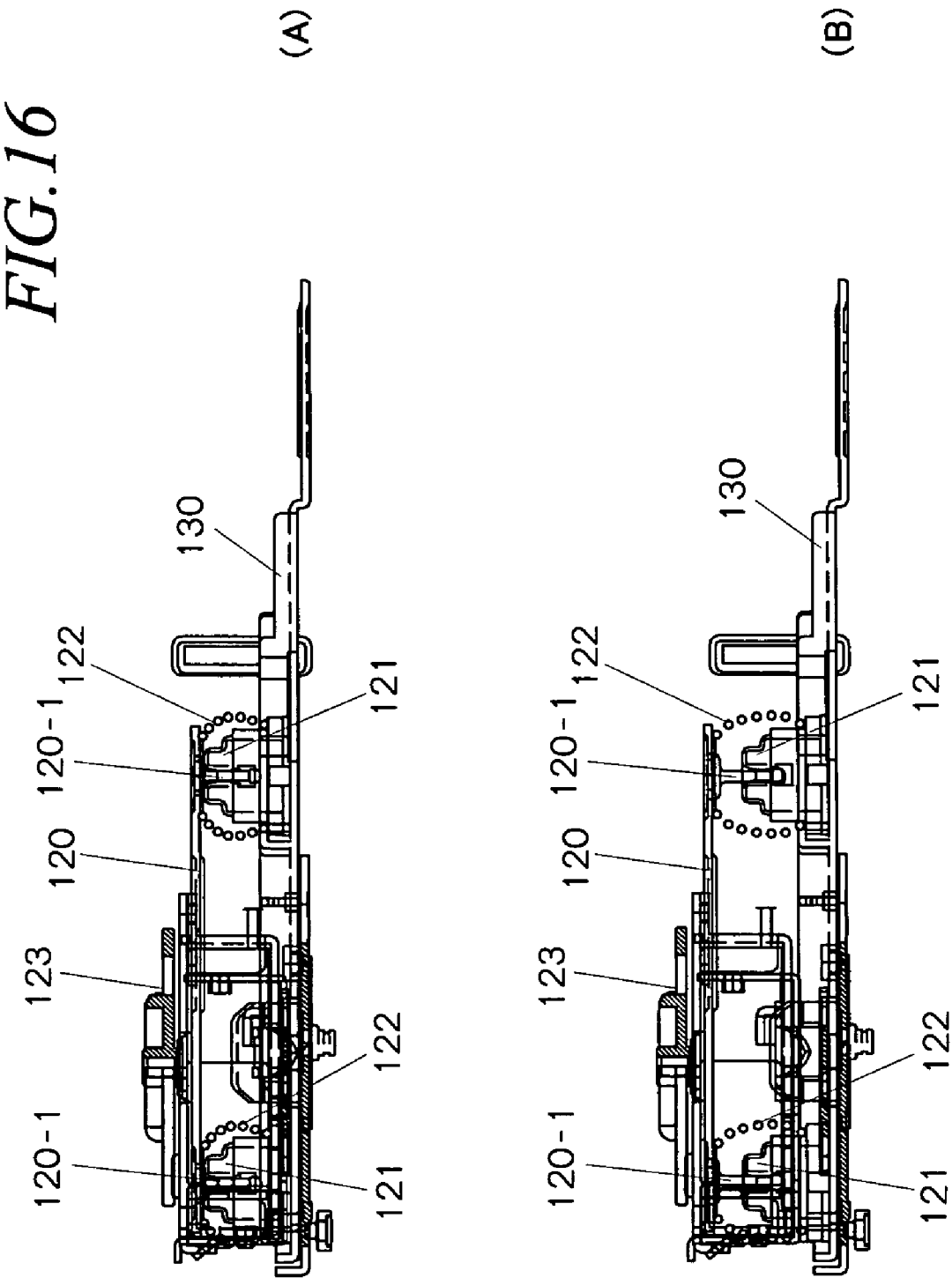

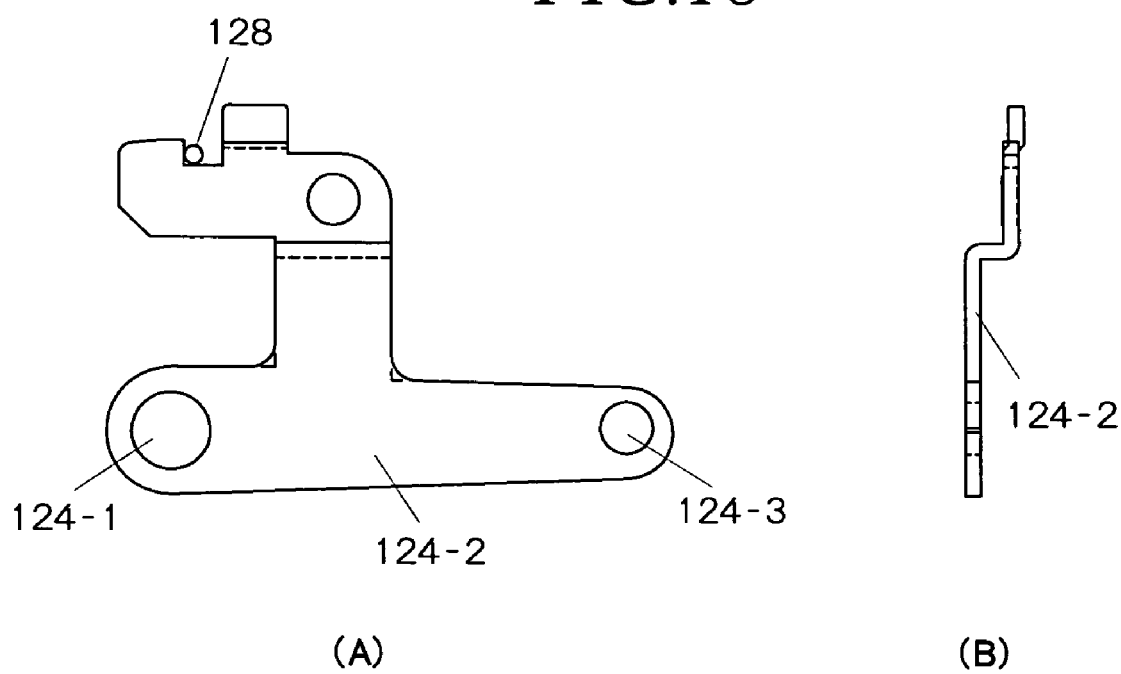

(A)　　　　　　　　　　　(B)

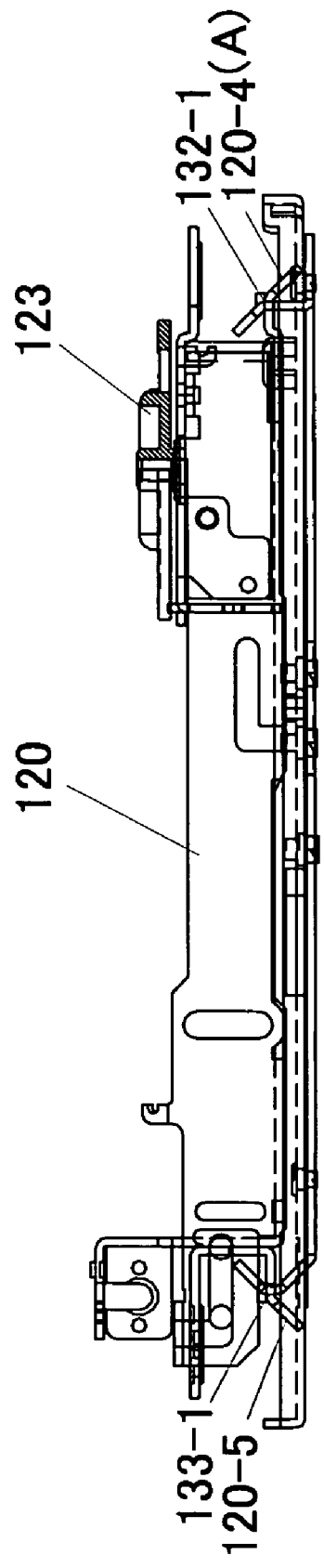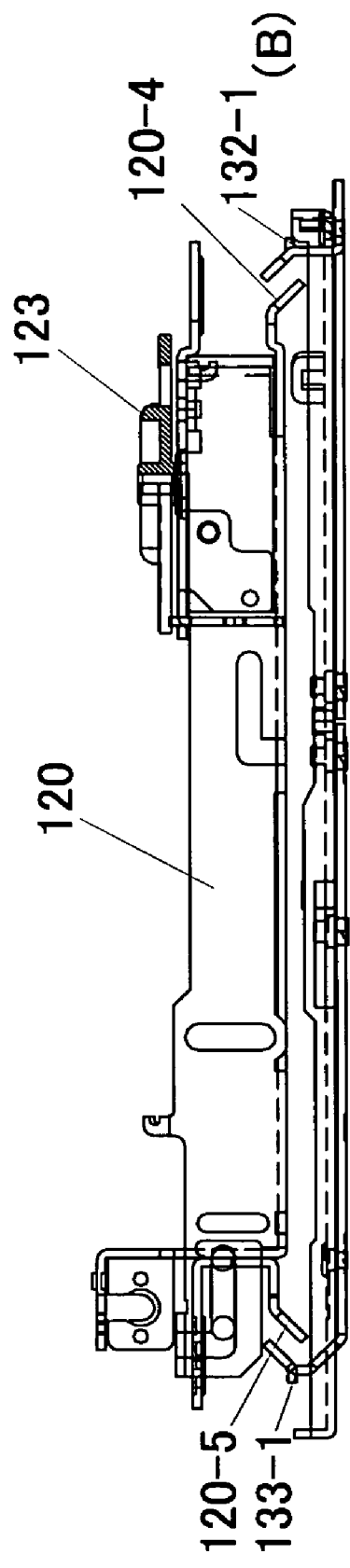

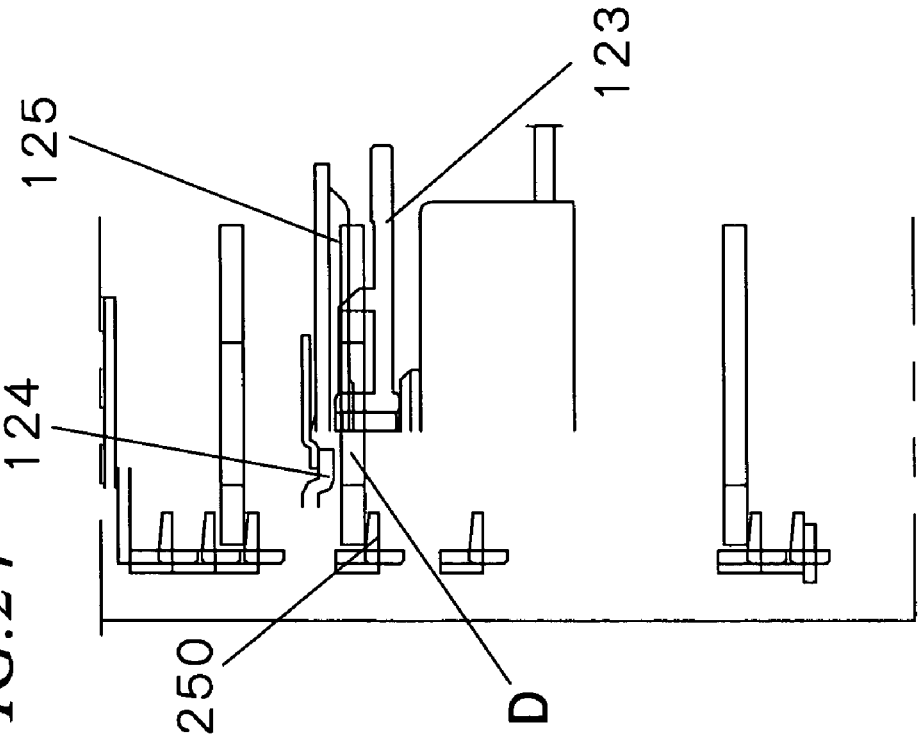
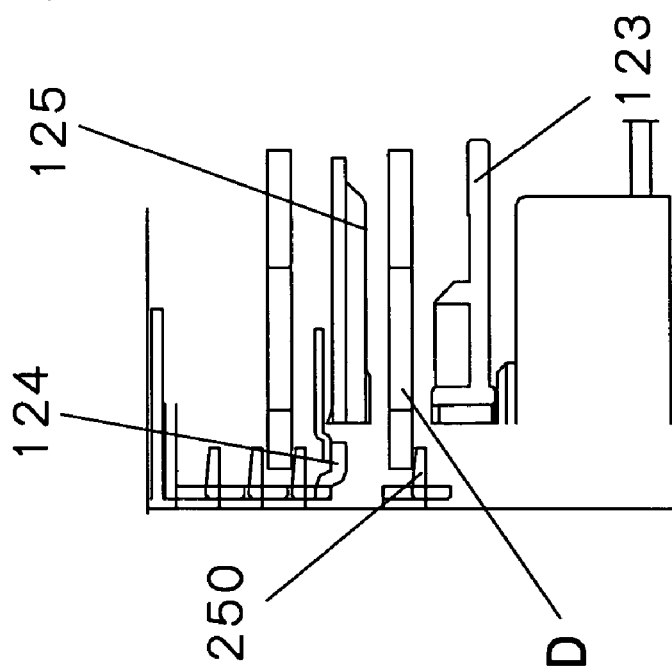
FIG. 24

FLOATING LOCK DEVICE

TECHNICAL FIELD

The present invention relates to a disk device, which brings a drive unit to a floating state for elastically supporting the drive unit for playing a disk, and improves resistance to vibration. Particularly, the present invention relates to the improvement of a floating lock device, which is applied to the drive unit swung and inserted into a space which is created by splitting disk holders housing a plurality of disks therein.

BACKGROUND ART

Conventionally, there has been widely used a disk device which is installed with a magazine for housing disks and in which a disk taken out from the magazine is automatically played. Such a disk device is excellent in operability since the disks do not have to be inserted or ejected one by one every time when playing the disk.

However, it is required that the magazine attached or detached with respect to the device be strong enough to protect a plurality of disks held therein when taking out the magazine to the outside. Therefore, the walls of the magazine main body are thick, and as a result the sizes of the magazine itself and the entire device for installing the magazine are large. Moreover, in order to take out a tray or the like holding the disks inside the magazine, a guiding groove and a rail section are provided on an inner face of a side wall of the magazine. By forming such a groove and rail section, the thickness of the magazine side wall further increases and the gap between each adjacent disk holder becomes wide, whereby the height of the magazine increases and the size of the device for installing the magazine also increases.

In addition, in order to take out a disk housed in the magazine and play the disk, it is necessary to provide a sufficient space in the device, thus the size of the device increases. Particularly, as in an on-board disk device or the like, in the case where a disk needs to be housed in a size of 180×50 (mm), which is called "DIN size", or a size of 180×100 (mm), which is called "double DIN size", small-size disk devices are highly demanded.

In order to deal with such demand, a disk device is developed in which a magazine is split, and a drive unit for playing a disk is provided in a space formed by splitting the magazine, so that the disk can be played without taking out the disk from the magazine (see Japanese Patent Application Laid-Open No. H11-232753, Japanese Patent Application Laid-Open No. H11-306637). Such disk device does not require a space for taking out and play a disk, thus the size of the entire device can be made small.

Furthermore, there is proposed a disk device, in which a detachable magazine is not used but disk holders capable of housing a plurality of disks therein are previously incorporated in the device in a stacked fashion, a disk inserted from a disk insertion opening is automatically housed in the disk holder, and the housed disk can be automatically ejected. In such a disk device, an opening, a mechanism and the like coping with the thickness of the magazine or attachment of the magazine are not required, thus a small-size device can be realized. Particularly, in the invention disclosed in Japanese Patent Application Laid-Open No. 2000-195134, disk holders are provided vertically so that they can be split as with the abovementioned split magazine, and a drive unit is inserted into the split disk holders, whereby a disk can be played without taking it out. Accordingly, further reduction in size of the device can be achieved.

Incidentally, in such an on-board disk device, there is provided a floating lock mechanism for switching between a floating state and a lock state of a drive unit. This mechanism brings the drive unit to a floating state for supporting the entire chassis of the disk device by means of only an elastic member such as a damper when playing a disk, so that vibration is not transmitted from the outside to the drive unit, and brings the drive unit to a lock state for fixing the chassis to the vehicle body when inserting/ejecting a disk and installing the disk on a turning table, so that the disk can be positioned accurately.

However, such a floating lock mechanism needs to perform damper supporting or locking for the entire chassis, thus the size of the mechanism increases, and it is difficult to synchronize an operation of moving the drive unit and an operation of installing a disk on the turning table. In order to cope with this problem, as described in Japanese Patent Application Laid-Open No. H11-232753, there is provided a floating lock mechanism which elastically supports only the drive unit on the drive chassis by means of the damper, and is operated so as to follow rotation of the drive chassis, whereby the drive chassis can be pulled into the disk holder and thereafter the drive unit can be brought into the floating state. However, the damper is disposed in a narrow space, thus it is not always easy to absorb vibration sufficiently.

Furthermore, such a conventional technology has a structure in which only a disk holding member, which holds a desired disk therein, is pressure-bonded to the turning table, and an inner edge of the disk is held by a member provided on the turning table, thus it is not always easy to stably hold the disk rotating on the turning table. Therefore, it is considered to provide the drive unit, which is swung and inserted, with a disk clamping mechanism for holding a disk between the disk clamping mechanism and the turning table, to stabilize the operation of holding the disk. However, in addition to a mechanism for swinging into and swinging out the drive unit, it is necessary to provide a floating lock mechanism and a disk clamping mechanism, but the configuration of the device may be complicated and enlarged.

Moreover, it is necessary to provide a mechanism for synchronizing an operation of swinging-in and swinging-out the drive unit, operations of pressure-bonding a disk to the turning table and releasing the disk from the turning table, and operations of performing floating lock and lock cancellation. However, it is difficult to additionally provide a component to be swung into a narrow space, such as a drive chassis, with a mechanism for synchronizing an operation of moving the drive unit and an operation of performing floating lock.

In addition, in the case of providing split housing sections with a structure for rotatably swinging and inserting a member installed with a drive unit, the member needs to be swung and inserted at an accurate height, thus it is essential to achieve facilitation and stabilization of rotation. In order to cope with such problem, it is considered to employ a structure for allowing the member installed with the drive unit to rotate around a long axis provided vertically in the disk device. In such a case, however, the size of the supporting structure of the rotational axis section increases easily, and a required space for avoiding an interference with other member also increases.

The present invention is, therefore, contrived in order to resolve the above problems of the conventional technology, and an object of the present invention is to provide a floating lock device which can smoothly and continuously perform an operation of swinging-in and swinging-out a drive unit and switching among a disk clamping mechanism, floating state, and lock state with a reduced space and simple configuration.

DISCLOSURE OF THE INVENTION

In order to achieve the abovementioned object, the present invention is a floating lock device, comprising: a swing arm which can be swung into and swung out of a space created by splitting disk housing sections capable of housing a plurality of disks; a drive chassis which is mounted on the swing arm and which comprises a drive playing the disk; and a floating lock mechanism which is provided on the swing arm and switches between a floating state in which the drive chassis is supported by an elastic member only, and a lock state in which the drive chassis is fixed to the swing arm, wherein the disk device further comprises a drive mechanism which drives the swing arm, and wherein the swing arm is provided with a transmitting member which transmits drive power of the drive mechanism to the floating lock mechanism so as to continuously perform shifting from an operation of swinging-in the swing arm to one operation of the floating lock mechanism or from an operation of swinging-out the swing arm to the other operation of the floating lock mechanism.

In the present invention described above, shifting from an operation of swinging of the swing arm by the drive mechanism, to an operation of lock cancellation of the floating lock mechanism, and shifting in the opposite pattern can be continuously carried out by the transmitting member.

In another embodiment, the drive mechanism has an auxiliary arm which rotates and thereby biases the swing arm in a swing-in direction and a swing-out direction, the transmitting member is provided rotatably by being biased by an end section of the auxiliary arm, and the swing arm is provided with a connecting cam which causes the auxiliary arm to bias the transmitting member during a period between time after the swing arm is swung-in and time before the swing arm is swung out.

In the abovementioned embodiment, shifting from an operation of swinging of the swing arm, to an operation of lock cancellation of the drive chassis, and shifting from an operation of the lock of the drive chassis to an operation of swinging out the swing arm can be carried out smoothly by the connecting cam between the auxiliary arm and the transmitting member.

In another embodiment, the floating lock mechanism has a pair of floating lock plates which are provided so as to be able to slidingly move between a lock position for engaging with the drive chassis and a floating position for separating from the drive chassis, in accordance with displacement of the transmitting member, the pair of floating lock plates being provided so as to be able to slidingly move in directions opposite to each other by means of a link arm provided rotatably on the swing arm.

In the abovementioned embodiment, either one of the pair of floating lock plates is biased and slidingly moved by the transmitting member, whereby the other slidingly moves automatically, thus the transmitting member can be simplified.

In another embodiment, the swing arm is provided with a biasing member which biases at least one of the pair of floating lock plates to the lock position.

In the abovementioned embodiment, the floating lock plate is biased to the lock position by the biasing member, thus the floating lock plate is prevented from being unstable at the time of locking.

In another embodiment, the drive unit has a turning table on which a disk is mounted, and a disk clamping mechanism which holds the disk between the disk clamp mechanism and the turning table, and the swing arm is provided with a transmitting member which transmits drive power of the drive mechanism to the disk clamping mechanism so as to continuously perform shifting from an operation of swinging-in the swing arm to one operation of the disk clamping mechanism or from an operation of swinging-out the swing arm to the other operation of the disk clamping mechanism.

In the abovementioned embodiment, shifting from an operation of swinging of the swing arm by the drive mechanism, to an operation of lock cancellation of disk clamping and the floating lock mechanism performed by the disk clamping mechanism, and shifting in the opposite pattern can be continuously carried out by the transmitting member.

In another embodiment, the drive mechanism has an auxiliary arm which rotates and thereby biases the swing arm in a swing-in direction and a swing-out direction, and the transmitting member is provided rotatably by being biased by an end section of the auxiliary arm.

In the abovementioned embodiment, the transmitting member, which is rotated by the auxiliary arm, operates the disk clamping mechanism and the floating lock mechanism, thus the continuous operation can be realized with a small space required.

In another embodiment, the floating lock mechanism has a floating lock plate which is provided so as to be able to slidingly move between a lock position for reducing the height of the elastic member by biasing the drive chassis to the swing arm side, and a floating position for recovering the height of the elastic member by canceling the bias on the drive chassis, in accordance with displacement of the transmitting member.

In the abovementioned embodiment, switching between the lock state and the floating state can be performed by means of a simple configuration in which the transmitting member slidingly moves the floating lock plate.

In another embodiment, the disk clamping mechanism comprises: a damper which holds a disk between the damper and the turning table; a clamp arm to which the damper is attached and which is provided so as to be able to move up and down; and a clamp plate which is provided so as to be slidingly moved by the transmitting member and, in accordance with the sliding movement, biases the clamp arm in a direction of moving the clamp arm up and down.

In the abovementioned embodiment, switching between the disk clamping state and the disk releasing state can be performed by means of a simple configuration in which the transmitting member slidingly moves the clamp plate.

In another embodiment, in a disk device provided in a chassis, the chassis is provided with a holding section which holds an end section of the swing arm which is swung-in.

In the abovementioned embodiment, the holding section inside the chassis holds an end section of the swing arm which is swung into the disk housing section, thus the disk device having high resistance to vibration can be obtained. Therefore, a disk device suitable for, for example, a non-board disk device can be configured.

In another embodiment, the elastic member comprises a combination of a damper and a coil spring, and at least three locations on the drive chassis are supported on the swing arm by the elastic member.

In the abovementioned embodiment, at least three points on the drive unit are supported by the double structure having a combination of a damper and a coil spring, thus high vibration absorbency can be obtained even if the space is narrow.

In another embodiment, the elastic member on at least one location is disposed on a position which is further away from the drive unit than other elastic members.

In the abovementioned embodiment, the elastic member on at least one location is positioned away from the drive unit, thus a stable support can be realized even if the space is narrow.

In another embodiment, the coil spring is in the form of a barrel.

In the abovementioned embodiment, since the coil spring is in the form of a barrel, the coil spring can be stretched widely in not only the vertical direction but also in the horizontal direction, thus the vibration absorbency further improves.

In another embodiment, the floating lock device further comprises: a supporting body which supports the swing arm rotatably around an axis; and biasing means for biasing the swing arm to the supporting body in the vicinity of the axis, wherein a spacer for facilitating rotation of the swing arm is sandwiched between the swing arm and the supporting body in the vicinity of the axis.

In the abovementioned embodiment, in the vicinity of the axis of the swing arm, there are provided a spacer for facilitating rotation of the swing arm and biasing means for biasing the swing arm to the supporting body side, whereby a stable rotation with no blurring can be realized without requiring a long axis, thus a floating lock device with a reduced-size and simple structure requiring a small space can be obtained.

In another embodiment, the biasing means is a circular plate spring.

In the abovementioned embodiment, pressure for biasing the swing arm to the supporting body can be made even by the circular plate spring, thus more stable rotation can be realized.

In another embodiment, the drive mechanism is provided on the supporting body so as to be able to rotate in parallel with the swing arm, and has an auxiliary arm which biases the swing arm in a swing-in direction and a swing-out direction in accordance with rotation of the drive mechanism.

In the abovementioned embodiment, the swing arm can be driven by the auxiliary arm rotating in parallel with the swing arm, thus the rotation can be further stabilized, and the space in the height direction can be prevented from being enlarged.

According to the description above, the present invention can provide a floating lock device which can smoothly and continuously perform an operation of swinging-in and swinging-out a drive unit and switching among a disk clamping mechanism, floating state, and lock state with a reduced space and simple configuration.

BRIEF DESCRIPTION OF THE DRAWINGS

FIG. 15 is a plan view showing a state in which the disk clamping mechanism of the disk device shown in FIG. 1 completes disk clamping;

FIG. 16A is a front view of a locked state showing an elastic supporting structure of a drive unit for the pick arm of the disk device shown in FIG. 1;

FIG. 16B is a front view of a lock cancellation state showing the elastic supporting structure of the drive unit for the pick arm of the disk device shown in FIG. 1;

FIG. 18A is a side view showing a biasing plate of the disk device shown in FIG. 1;

FIG. 18B is a front view showing the biasing plate of the disk device shown in FIG. 1;

FIG. 20A is a side view showing the locked state shown in FIG. 20;

FIG. 20B is a side view showing the lock cancellation state;

FIG. 24A is an explanatory diagram showing a state in which a clamper of the disk device shown in FIG. 1 is swung; and FIG. 24B is an explanatory diagram showing a state in which the disk is clamped in the disk device shown in FIG. 1.

BEST MODE FOR CARRYING OUT THE INVENTION

Hereinafter, an embodiment ("present embodiment", hereinafter) of an on-board disk device to which the present invention is applied is described in detail with reference to the drawings. It should be noted that, in the following descriptions of the drawings, the front face side of the disk device is the head side, the back face side of same is the rear side, and the vertical and longitudinal directions correspond to the directions viewed from the front face side of the disk device.

[A. Entire Configuration]

Figure 1:
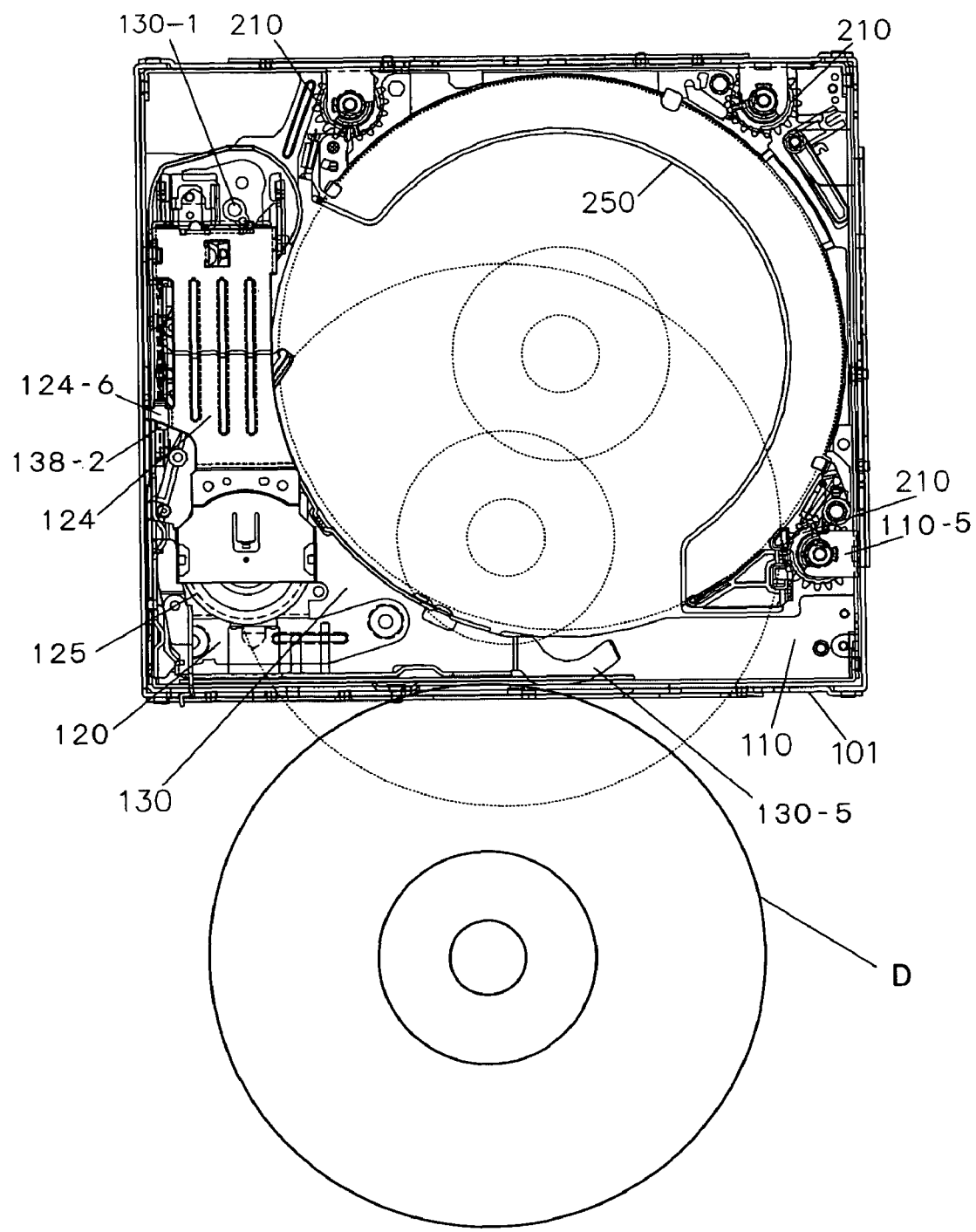
FIG. 1 is a plan view showing an embodiment of the disk device of the present invention.
Figure 2:
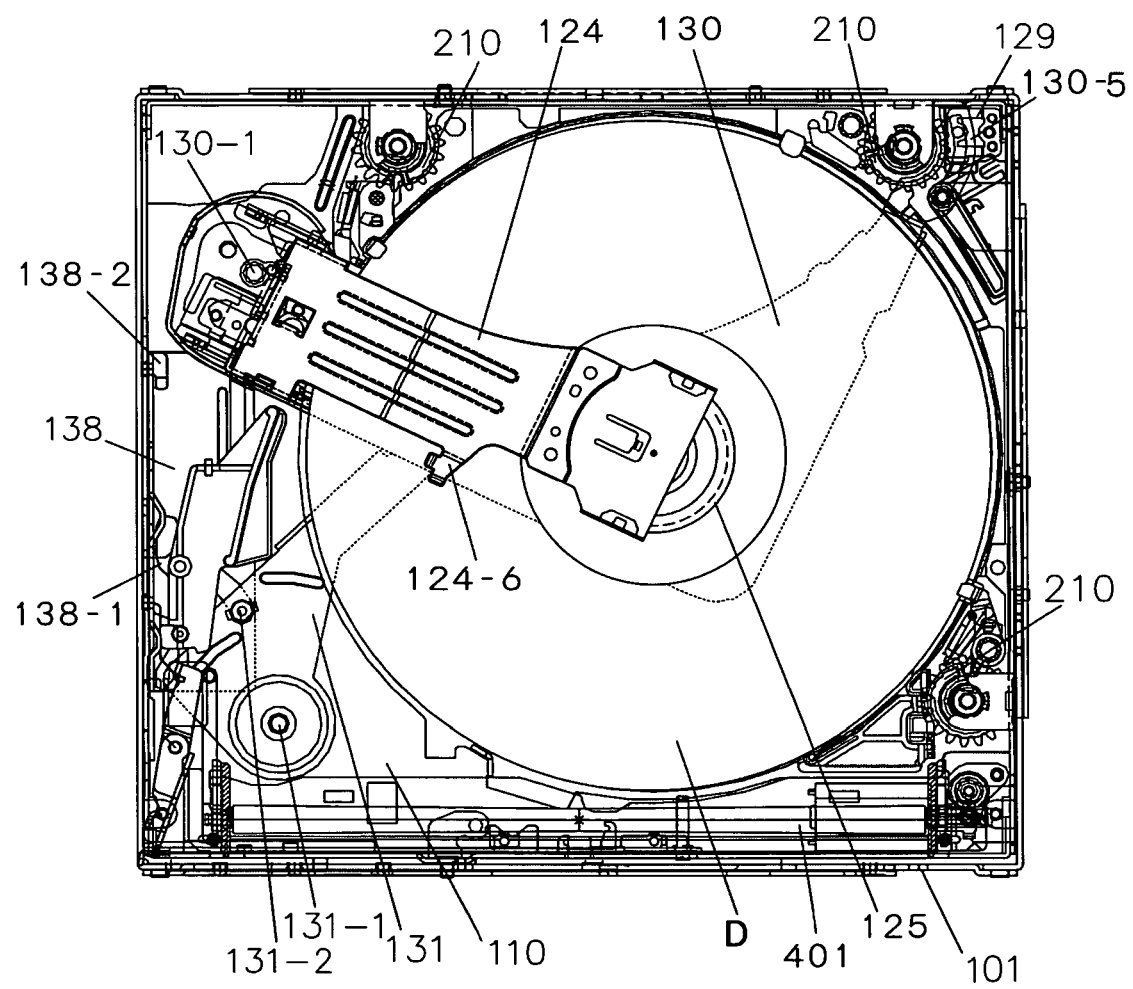
FIG. 2 is a plan view showing a state in which a disk shown in FIG. 1 is housed.
Figure 3:
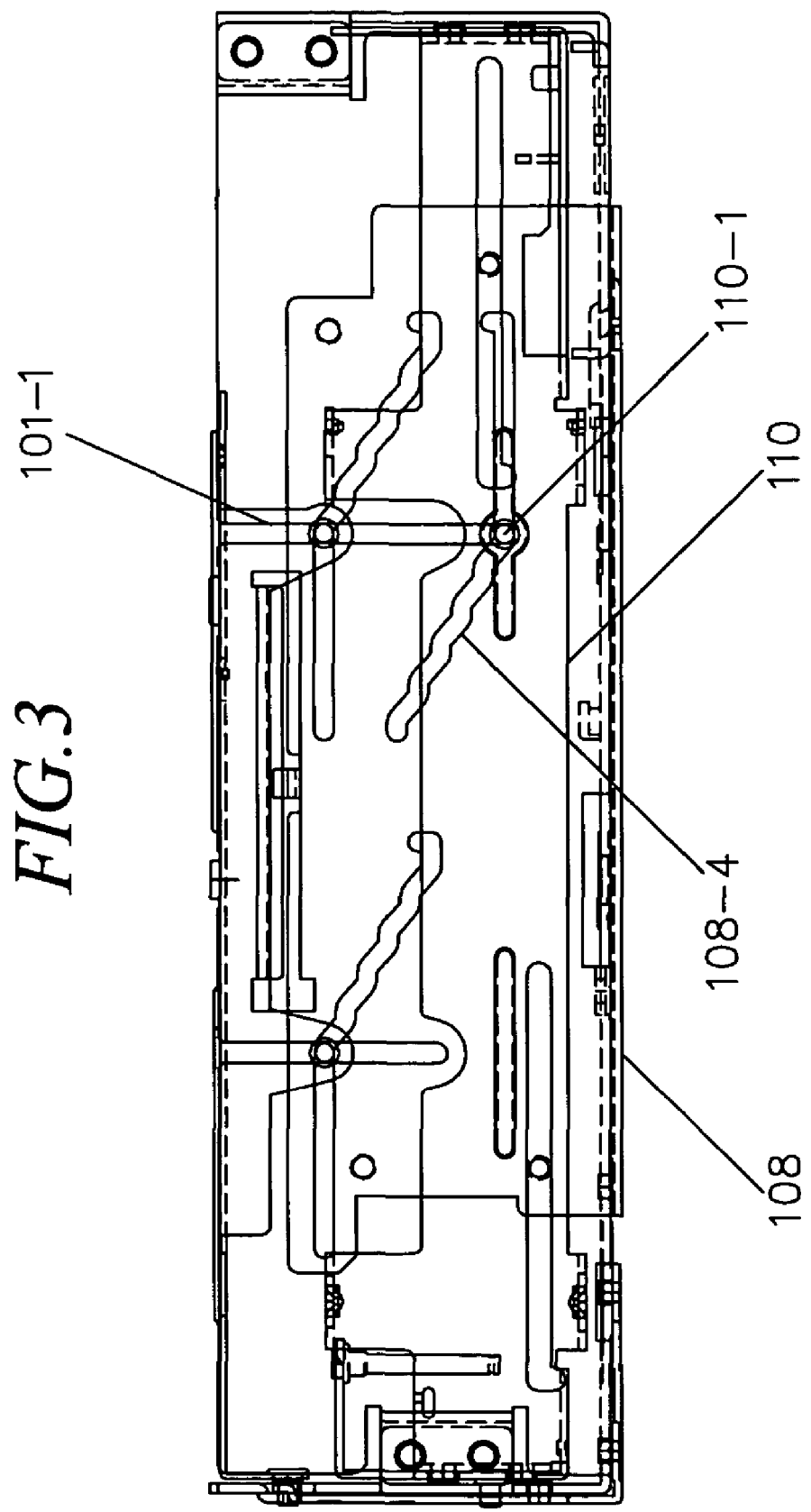
FIG. 3 is a back view showing the chassis and a shift plate of the disk device shown in FIG. 1.
Figure 4:
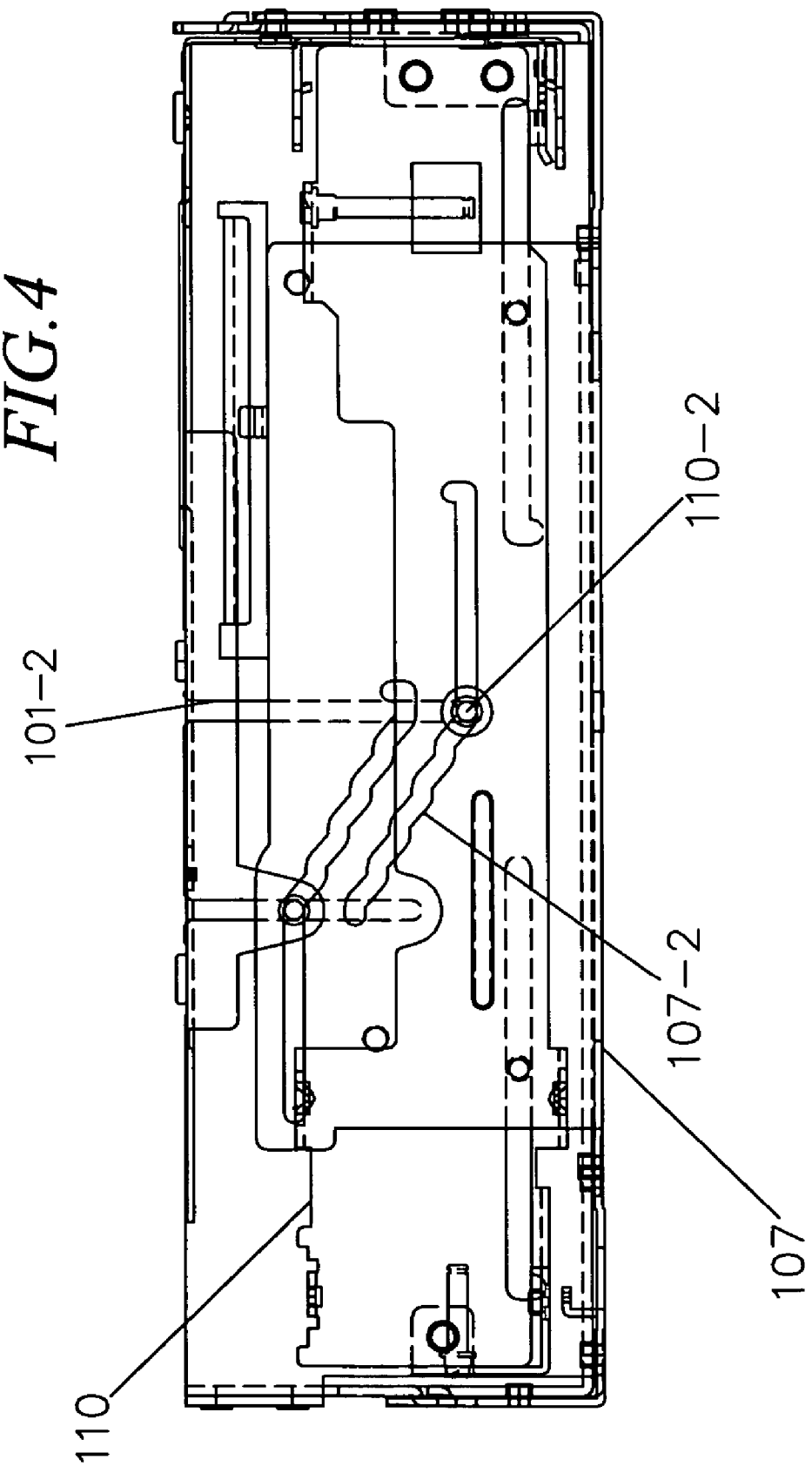
FIG. 4 is a right side view showing the chassis and the shift plate of the disk device shown in FIG. 1.
Figure 5:
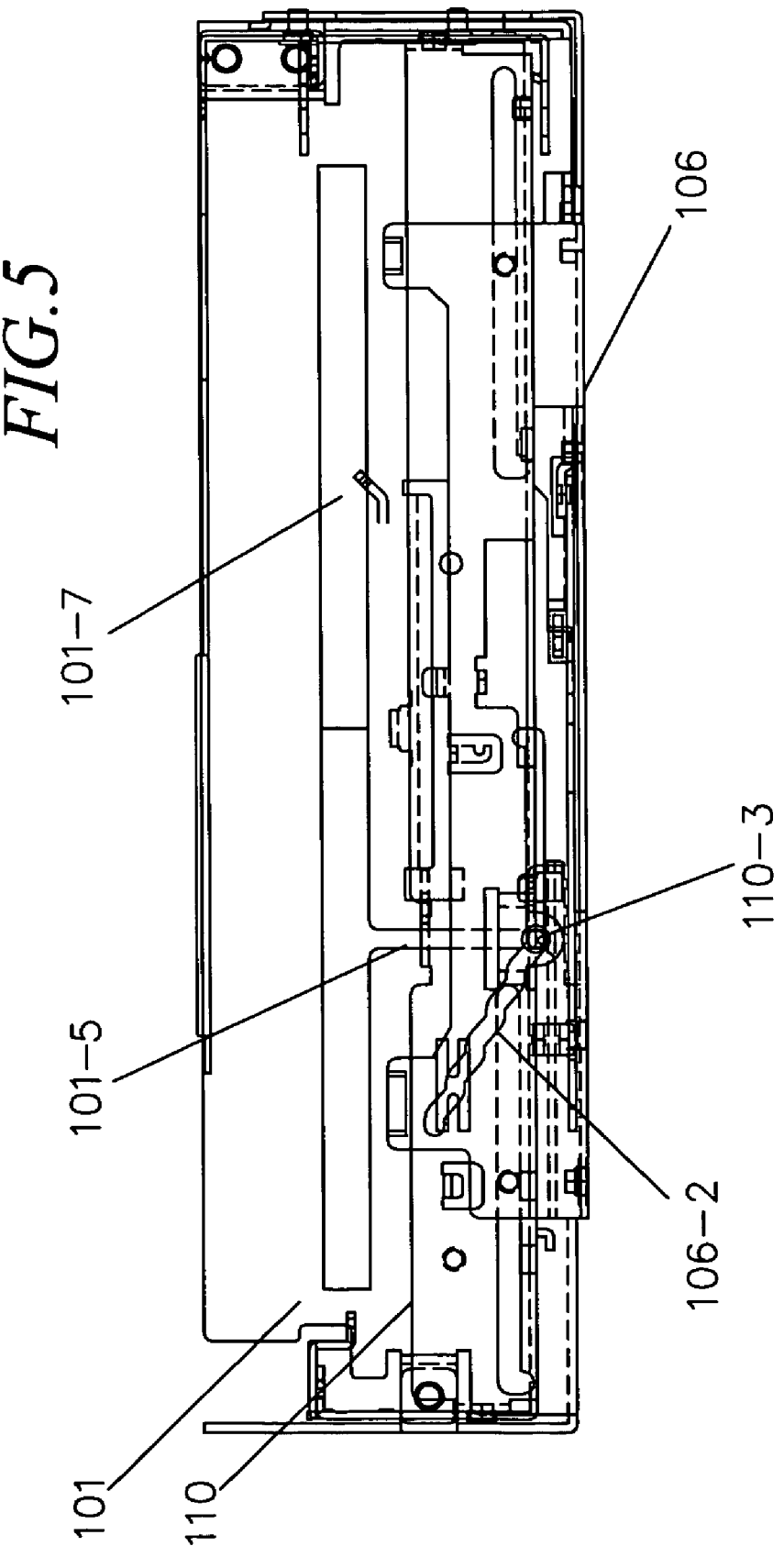
FIG. 5 is a front view showing the chassis and the shift plate of the disk device shown in FIG. 1.

The present embodiment has the following schematic configurations as shown in FIG. 1 and FIG. 2:

(1) A pick chassis 110, in which a number of trays 250 holding disks D are stacked.

(2) A pick arm 130 which is provided on the pick chassis 110 and swung to be inserted between split trays 250 (corresponding to the swing arm described in the claims).

(3) A drive chassis 120 which is provided on the pick arm 130 and comprises a drive unit (including a turning table 123 and the like) playing the disk D.

(4) A floating lock mechanism which is provided on the pick arm 130 and performs floating lock of the drive chassis 120 (including floating lock plates 132, 133, and the like (FIG. 6)).

(5) A disk clamping mechanism which installs a disk D onto the turning table 123 (including a clamp arm 124, a clamper 125 and the like).

(6) A drive mechanism which drives the pick arm 130 (including a pick swing cam plate 138 and the like).

It should be noted that the transmitting member described in the claims corresponds to a control plate 136 and the auxiliary arm corresponds to the pick swing arm 131. The control plate 136 rotates along with rotation of the pick swing arm 131, and drives the disk clamping mechanism and the floating lock mechanism, thus an explanation thereof is provided an explanation of each part.

[B. Configuration of Each Part]

[1. Pick Chassis (FIGS. 1 Through 5)]

The pick chassis 110 is provided so as to be able to move up and down in the chassis 101, and is formed with a substantially fan-shaped gap so as not to interfere with the disk D and the trays 250 by moving up and down. The front and rear faces and the right and left side faces of the pick chassis 110 are bent at a right angle from the bottom face thereof along the inner side faces of the chassis 101. The rear face (FIG. 3), right side face (FIG. 4) and front face (FIG. 5) of the pick chassis 110 are calked by pick elevating pins 110-1, 2, 3 respectively.

These pick elevating pins 110-1, 2, 3 are engaged with vertical pick guide grooves 101-1, 101-4, 5 formed in the chassis 101. The pick elevating pins 110-1, 2, 3 are engaged with pick elevating cams 108-4, 107-2,106-2, which are step-like grooves or holes formed respectively on a shift plate 108, shift plate 107, and a shift plate 106 provided slidably on side faces of the chassis 101. Therefore, by synchronous sliding movement of the shift plates 108, 107 and 106, the pick chassis 110 moves up and down.

[2. Pick Arm (FIGS. 1, 2, 6 Through 12)]

Figure 9:
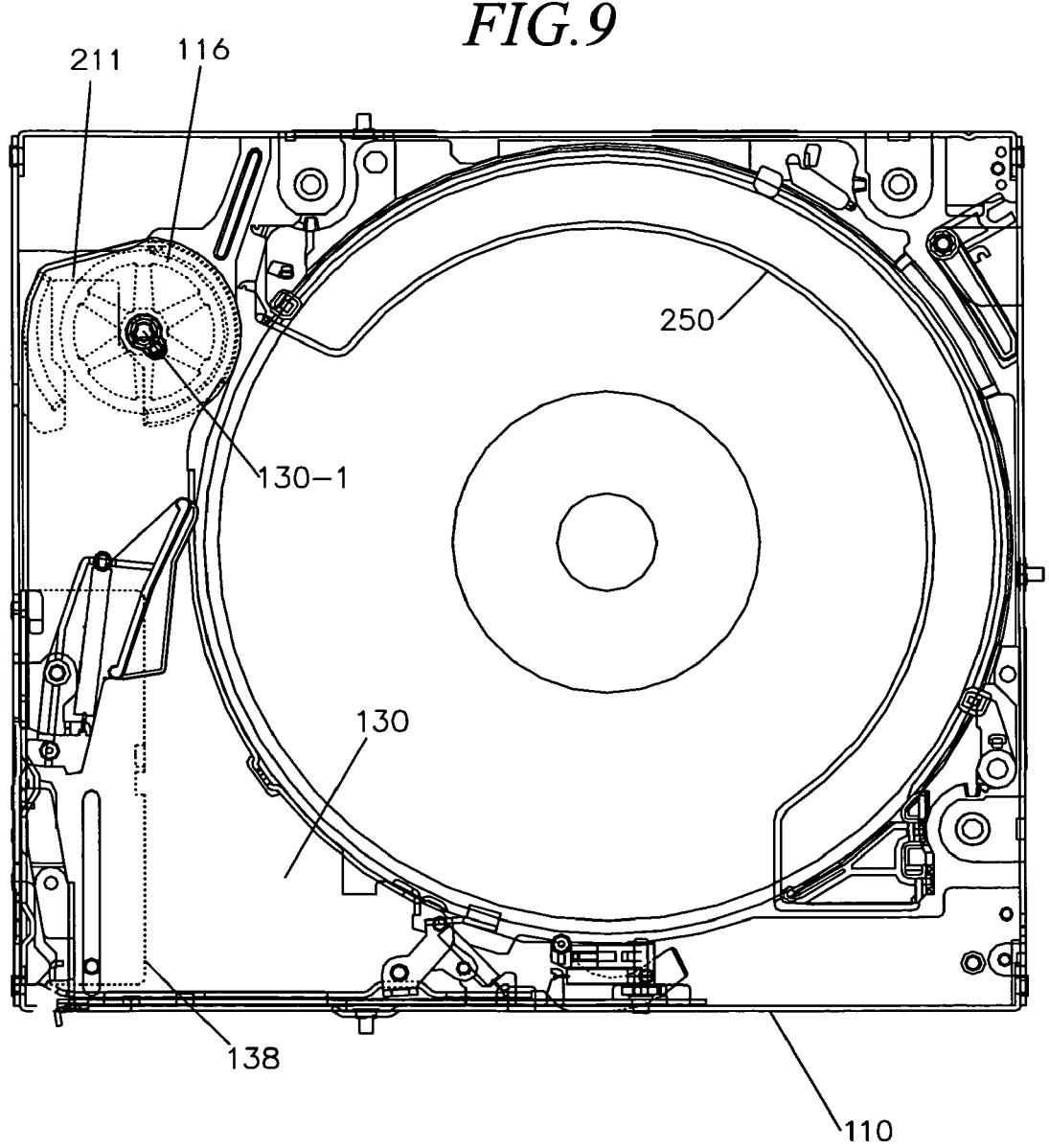
FIG. 9 is a plan view showing a state in which the pick arm is attached to the pick chassis of the disk device shown in FIG. 1.
Figure 10:
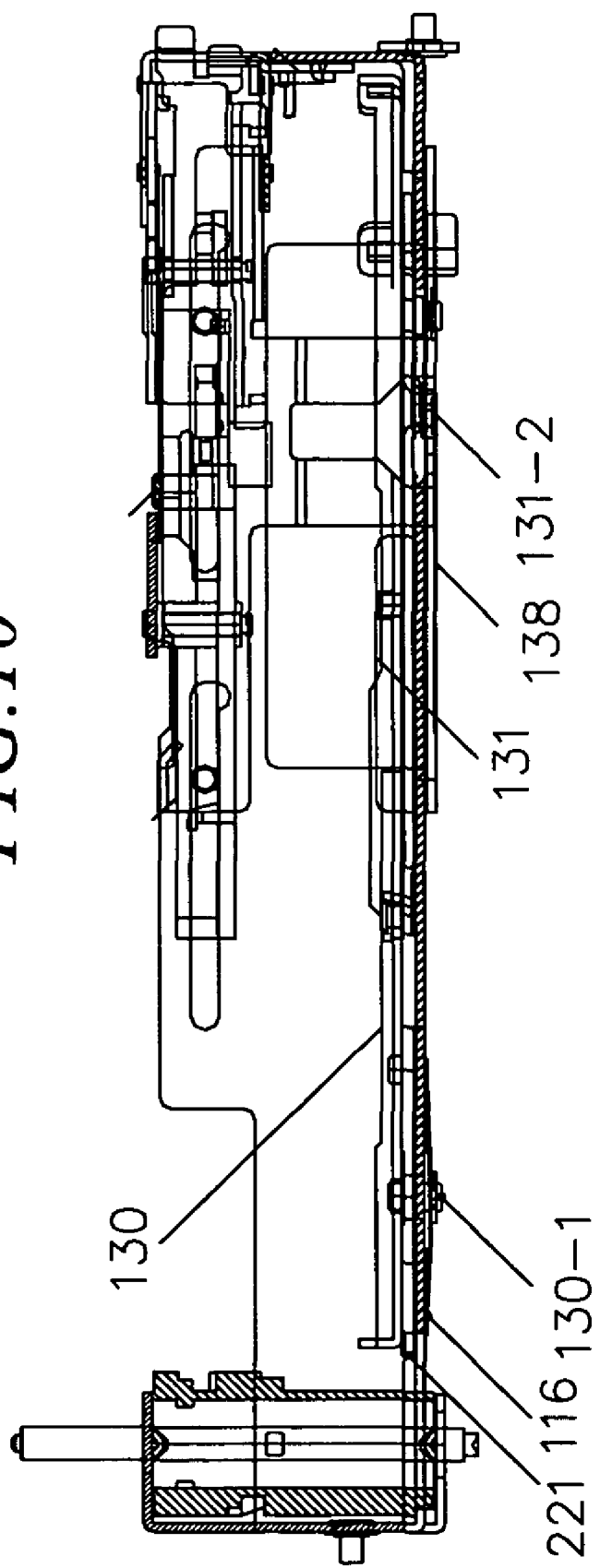
FIG. 10 is a side view of FIG. 9.
Figure 11:
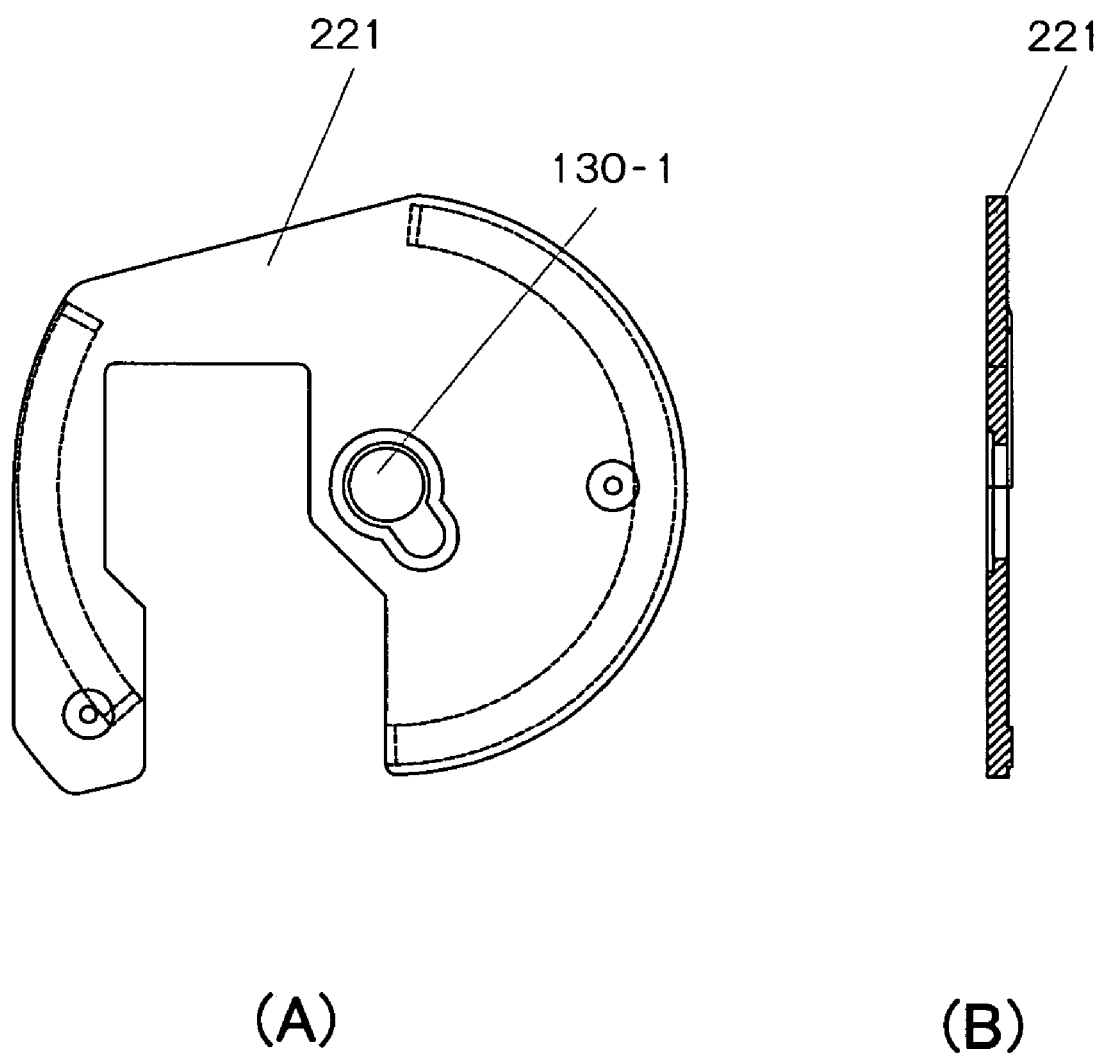
FIG. 11A is a plan view showing a spacer shown in FIG. 9.
FIG. 11B is a side view showing the spacer shown in FIG. 9.
Figure 12:
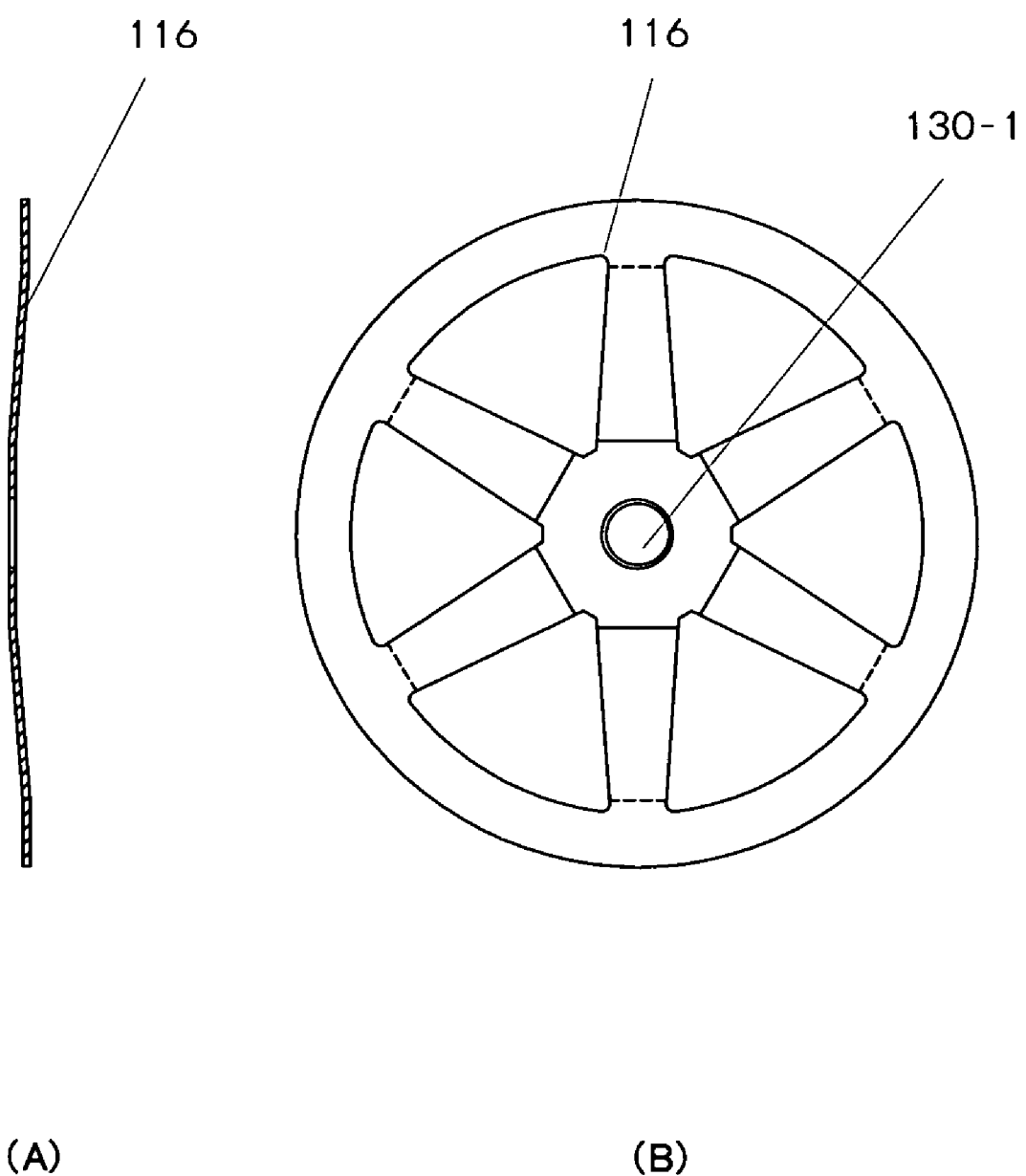
FIG. 12A is a side view showing a plate spring shown in FIG. 9.
FIG. 12B is a plan view showing the plate spring shown in FIG. 9.

The pick arm 130 is attached to an upper part of the left bottom face of the pick chassis 110 so as to be able to rotate freely around an axis 130-1 as a spindle. As shown in FIGS. 9 through 11, in this axis 130-1, a pick arm spacer 221 for facilitating rotation of the pick arm 130 is held between the pick arm 130 and the upper part of the bottom face of the pick chassis 110. Further, as shown in FIGS. 9, 10, 12, a disk-like plate spring 116 for pushing the pick arm 130 against the pick chassis 110 via the axis 130-1 is attached to the reverse face of the pick chassis 110.

Furthermore, on the pick arm 130, there is formed a connecting cam 130-2 into which a two-stage roller 131-3 of the pick swing arm 131 is inserted, the two-stage roller 131-3 being described hereinafter. This connecting cam 130-2 has an inclined section for rotating the pick arm 130 and an arc section for rotating a control plate 136 which is described hereinafter.

A leading end of the pick arm 130 (opposite end from the axis 130-1) is provided with a hook 130-5. This hook 130-5 is a section held on the rear face side of the pick chassis 110 when the pick arm 130 is swung. Specifically, a holding section 129, which is a pair of plates in the horizontal direction, is fixed on a right rear corner of the pick chassis 110, and the hook 130-5 is held so as to be sandwiched between these plates. Moreover, as described hereinafter, the pick arm 130 is provided with a drive chassis 120 having a drive unit including a pick up, turning table and the like, and a clamp arm 124 having a damper 125 and the like.

[3. Pick Swing Arm (FIGS. 1, 2, 6 Through 8)]

Figure 7:
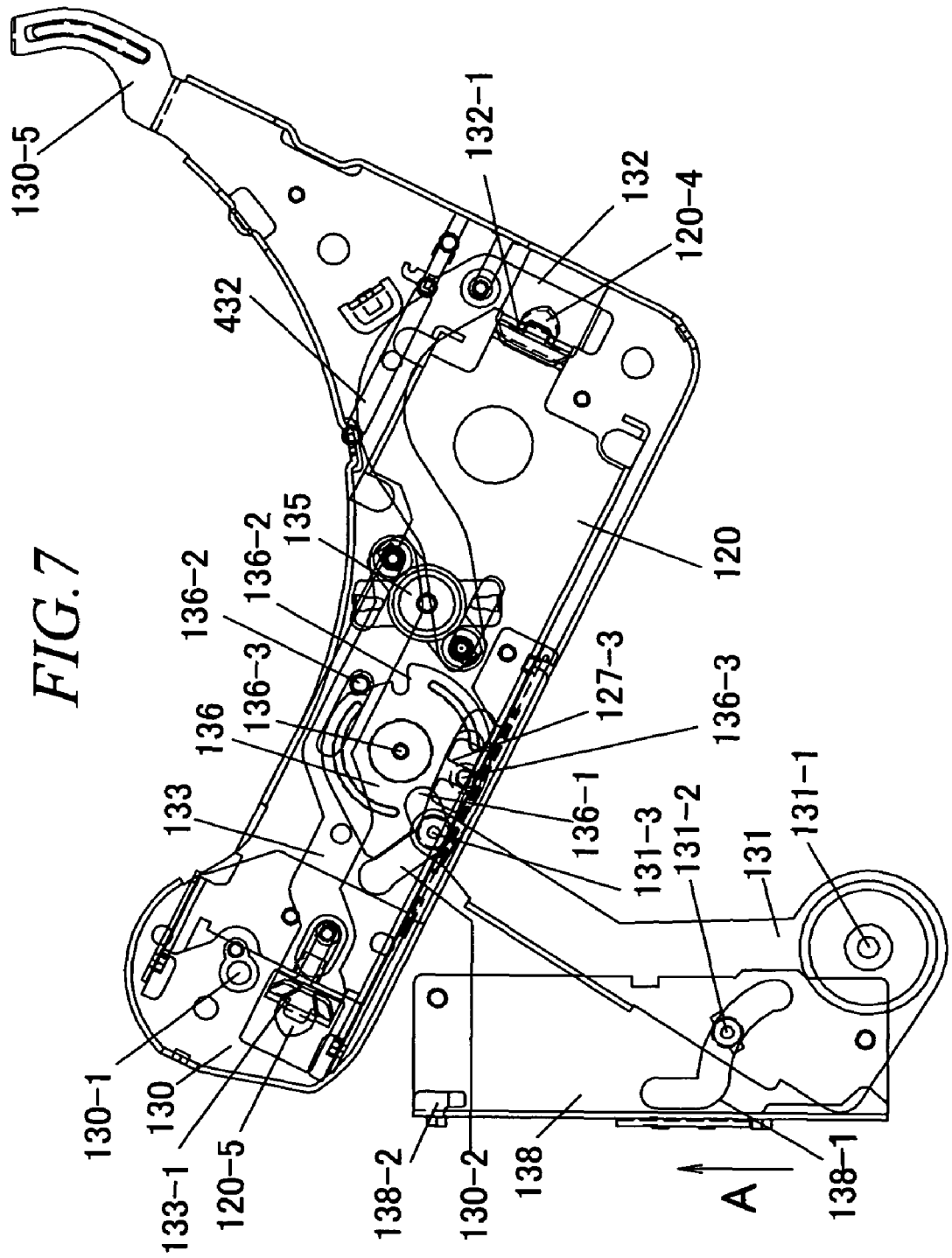
FIG. 7 is a plan view showing a state in which the pick arm shown in FIG. 1 is swung.
Figure 8:
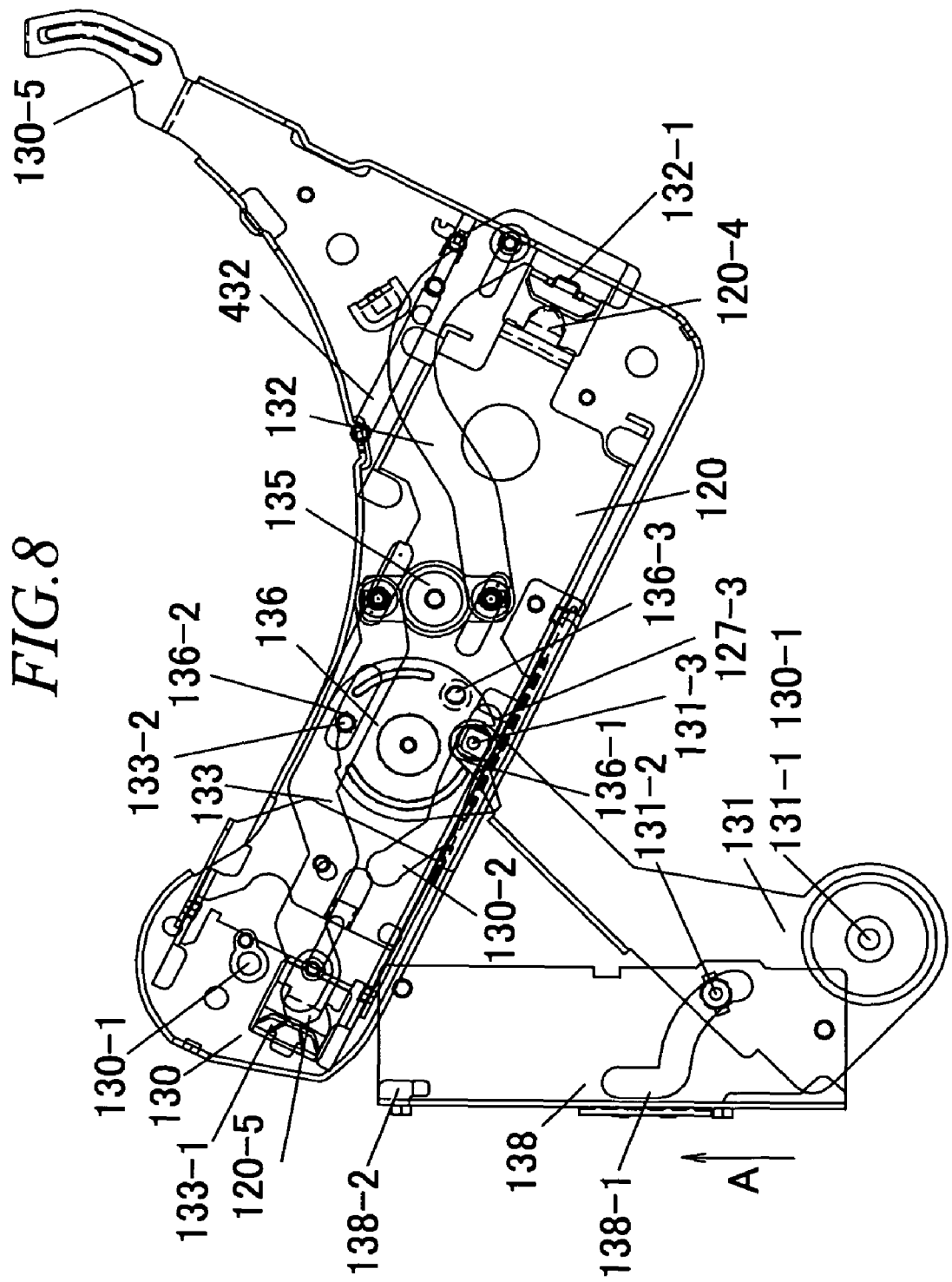
FIG. 8 is a plan view showing a state in which floating lock of the pick arm shown in FIG. 1 is canceled.

As shown in FIGS. 2, 7, 8, the pick swing arm 131 is disposed between the pick arm 130 and the pick chassis 110 and attached to the pick chassis 110 so as to be rotatable around an axis 131-1 engaged with a hole of the pick chassis 110. A roller 131-2 is rotatably attached to a left reverse face of the axis 131-1 of the pick swing arm 131. This roller 131-2 is inserted into a cam groove 138-1 of a pick swing cam plate 138, which is described hereinafter. The two-stage roller 131-3 is attached rotatably to a leading end section of the pick swing arm 131. This two-stage roller 131-3 is inserted into the connecting cam 130-2 provided on the pick arm 130.

[4. Pick Swing Cam Plate (FIGS. 1, 2, 6 Through 8)]

Figure 6:
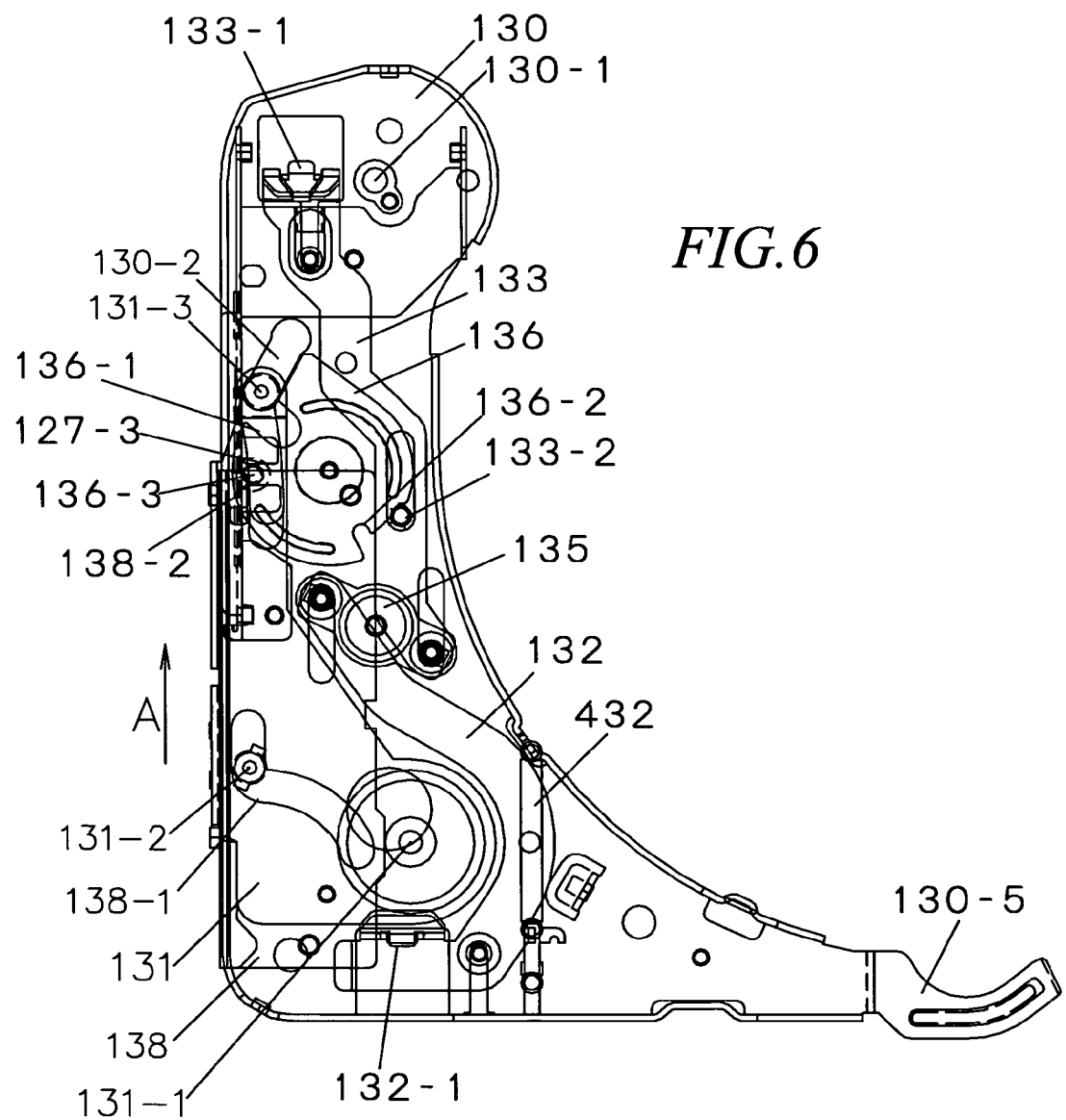
FIG. 6 is a plan view showing a pick arm of the disk device shown in FIG. 1.

As shown in FIGS. 6 through 8, the pick swing cam plate 138 is attached to the reverse face of the pick chassis 110 so as to be able to slidingly move back and forth. In this pick swing cam plate 138, as shown in FIG. 8, a left end section thereof is bent upward, and a lifting section 138-2, which is bent inwardly to form a step, is formed above the bent left end section. This lifting section 138-2, as shown in FIG. 1, lifts up a lifted section 124-6 of the clamp arm 124 from the bottom and thereby secures a clearance for inserting the disk D.

The roller 131-2 of the pick swing arm 131 is inserted into the swinging cam 138-1, which is a groove or a hole formed on the bottom face of the pick swing cam plate 138, and the rear section of the swinging cam 138-1 is formed straight in an anterior-posterior direction while the front section of same is in the form of an arc. Therefore, as shown in FIGS. 6 through 8, when the pick swing cam plate 138 moves backward (direction of A), the pick swing arm 131 rotates clockwise. It should be noted that, in accordance with such rotation of the pick swing arm 131, the two-stage roller 131-3 attached to the front part of the pick swing arm 131 biases the pick arm 130 so that the pick arm 130 rotates counterclockwise, while moving inside the connecting cam 130-2 formed on the pick arm 130.

[5. Drive Chassis (FIGS. 13 Through 16)]

As shown in FIGS. 13 through 16, a pin 120-1 which is fixed to the drive chassis 120 is inserted into three dampers 121 disposed on the pick arm 130, whereby the drive chassis 120 is elastically supported. Moreover, a barrel-like coil spring 122 is disposed between the drive chassis 120 and the pick arm 130 such that the pin 120-1 and the damper 121 are inserted into the coil spring 122, thus the drive chassis 120 is elastically supported double on the pick arm 130 by the coil spring 122 and the damper 121. Then, a pair of the damper 121 and the coil spring 122 are disposed on a leading end side of the pick arm 130 (right side in FIG. 16) so as to be positioned away from the turning table 123 which is described hereinafter.

The drive chassis 120 is provided with a drive unit. This drive unit comprises members required for playing the disk D, such as the turning table 123 on which the disk D is mounted, a spindle motor M3 which rotates the turning table 123, a pick up unit which is not shown but reads a signal of the disk D, a thread motor which moves the pick up unit, a pick up feed mechanism having a feed screw and the like.

[6. Disk Clamping Mechanism (FIGS. 13 T*hrough* 18)]

Furthermore, the disk clamping mechanism for installing the disk D on the turning table 123 is disposed on the drive chassis 120 in the manner described hereinbelow. First, there are provided the clamper 125 which presses the disk D on the tuning table 123, and the clamp arm 124 to which the clamper 125 is attached so as to be able to rotate concentrically with the turning table 123.

A pin 124-1, which is formed on a vertical face on each side of a rear section of the clamp arm 124, is inserted into a vertical groove 120-2 which is formed on a vertical face on each side of the drive chassis 120, whereby the clamp arm 124 is provided movably in a vertical direction. A rear end of a substantially T-shaped biasing plate 124-2 shown in FIG. 18 is attached on the left side of the clamp arm 124 so as to be rotatable around the pin 124-1 as an axis. A pin 124-3, which is provided on a front end of the biasing plate 124-2, is inserted into a groove 120-3 which is formed on the left vertical face of the drive chassis 120 so as to be in parallel with the groove 120-2.

The pin 124-1 moves along the grooves 120-2, 3, whereby the clamp arm 124 moves up and down in parallel with the drive chassis 120, but this up-and-down movement is controlled by sliding movement of a clamp plate 127 which is provided in the drive chassis 120. The sliding movement of the clamp plate 127 is performed by the control plate 136. Specifically, the control plate 127 is provided with a groove 127-3 which is engaged with a pin 136-3 provided on the control plate 136, the pin 136-3 being described hereinafter, thus the clamp plate 127 is configured so as to be able to slidingly move in accordance with rotation of the control plate 136.

Figure 13:
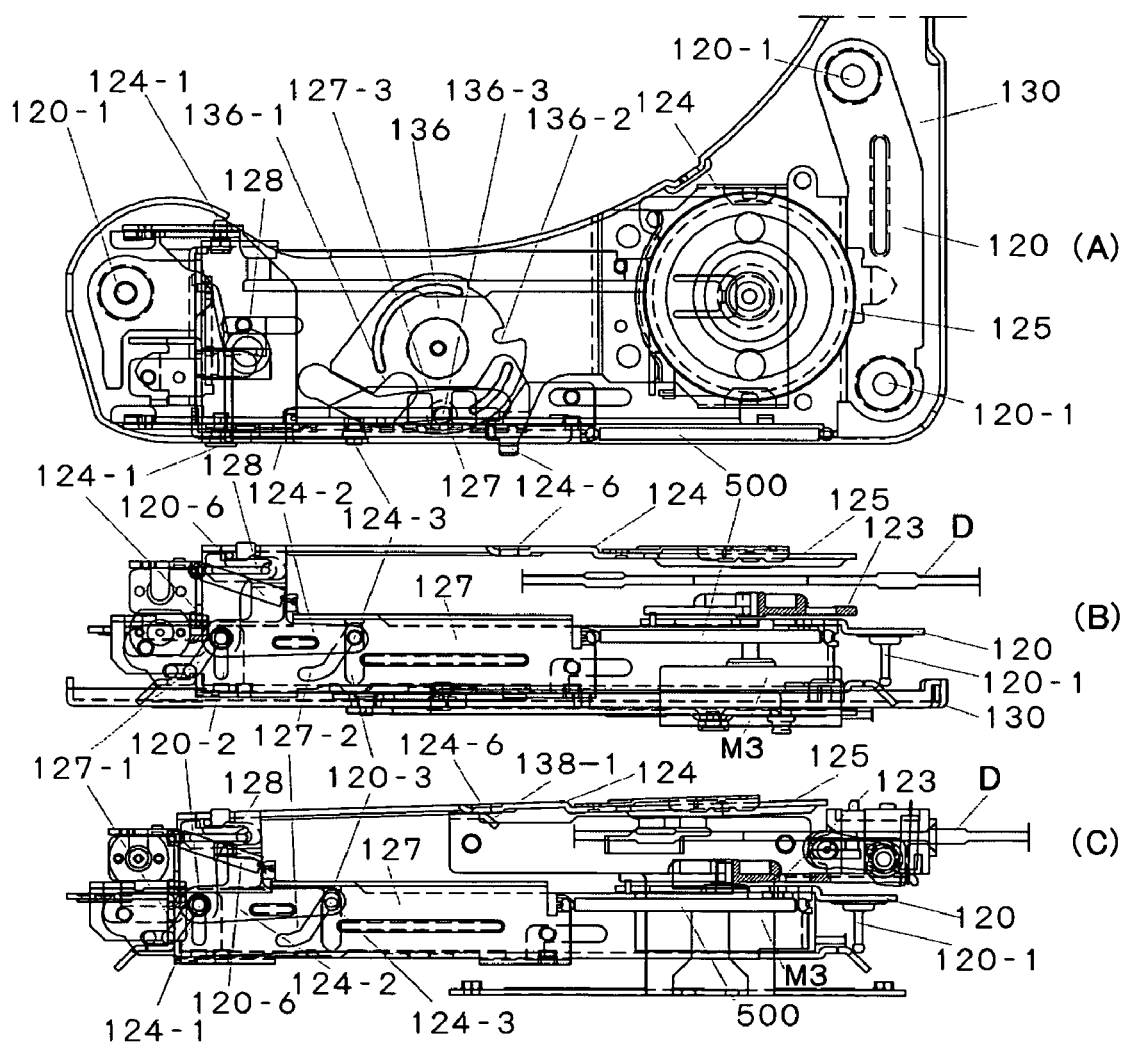
FIG. 13A is a plan view showing a state in which a disk is opened by a disk clamping mechanism of the disk device shown in FIG. 1.
FIG. 13B is a side view showing a state in which the disk is opened by the disk clamping mechanism of the disk device shown in FIG. 1.
FIG. 13C is a side view showing a state in which the disk is inserted by the disk clamping mechanism of the disk device shown in FIG. 1.
Figure 14:
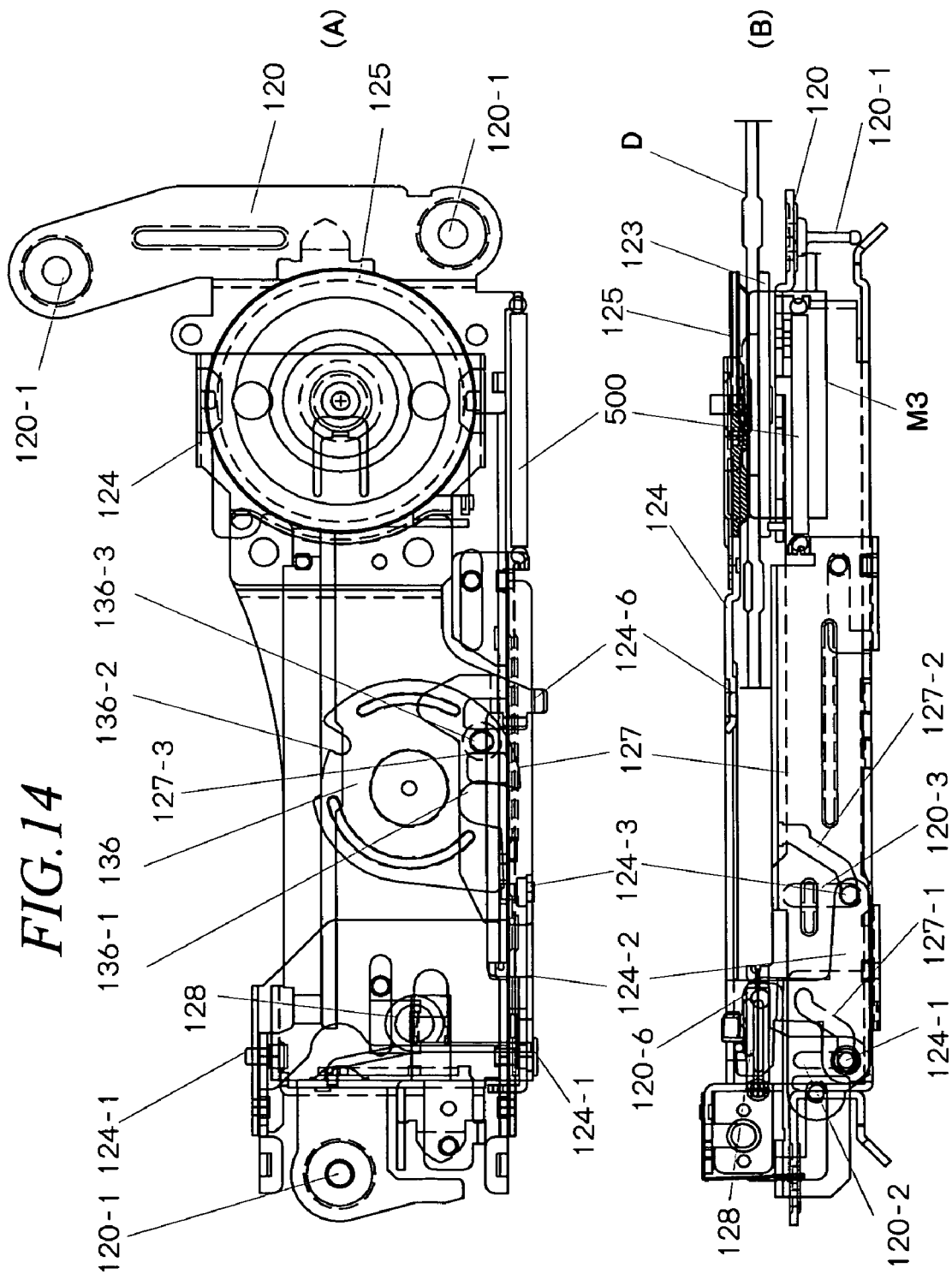
FIG. 14A is a plan view showing a state in which the disk clamping mechanism of the disk device shown in FIG. 1 performs disk clamping.
FIG. 14B is a side view showing a state in which the disk clamping mechanism of the disk device shown in FIG. 1 performs disk clamping.

On vertical faces on both side of the clamp plate 127, there is formed an inclined cam 127-1 inserted into the pin 124-1 of the clamp arm 124, and on the vertical face on the left side there is formed a inclined cam 127-2 into which the pin 124-3 of the biasing plate 124-2 is inserted. Therefore, when the clamp plate 127 slidingly moves, the inclined cams 127-1, 127-2 bias the pins 124-1, 124-3 upward or downward, whereby the clamp arm 124 moves up and down. It should be noted that, as shown in FIGS. 13 through 15, a spring 500, which holds the clamp arm 124 in a state in which the disk is pressure-bonded, is disposed between a front end of the clamp plate 127 and the drive chassis 120.

Figure 17A:
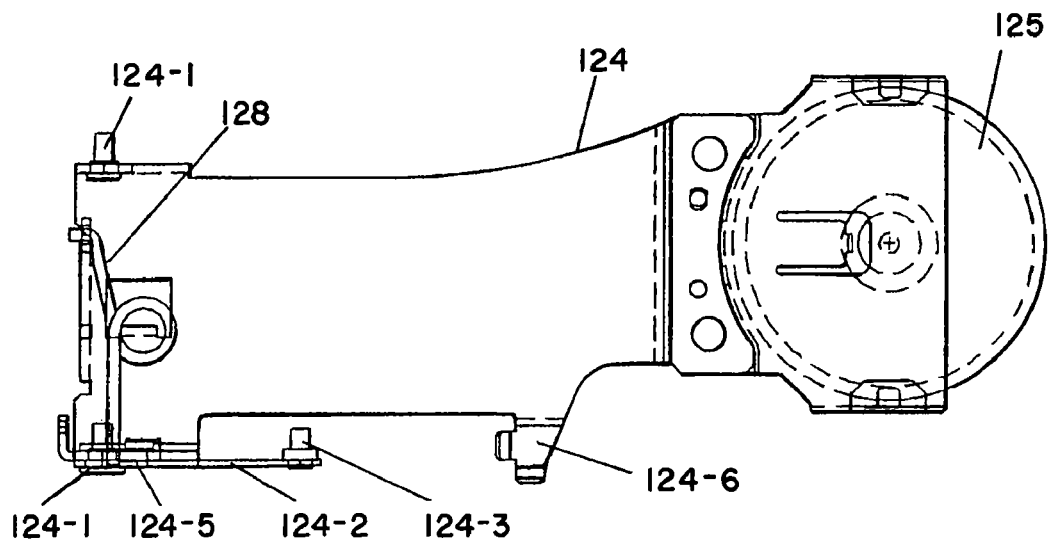
FIG. 17A is a plan view showing a clamp arm of the disk device shown in FIG. 1.
Figure 17B:
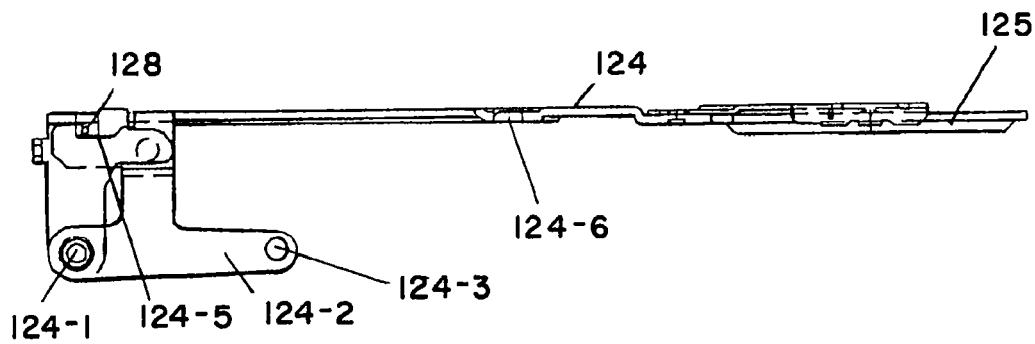
FIG. 17B is a side view showing the clamp arm of the disk device shown in FIG. 1.
Figure 17C:
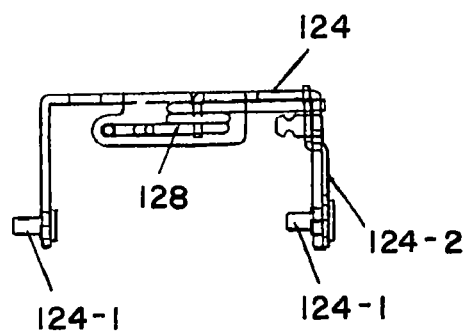
FIG. 17C is a rear side view showing the clamp arm of the disk device shown in FIG. 1.

Further, as shown in FIG. 17, a torsion spring 128 is disposed on a rear section of the clamp arm 124. One end of the torsion spring 128 is inserted into a hole 124-5 which is formed on the vertical face on the right side of the clamp arm 124, and the other end of the torsion spring 128 is locked with a rear end of the clamp arm 124. An upper end of the biasing plate 124-2 is in contact with the vicinity of the hole 124-5 of the clamp arm 124, and one end of the torsion spring 128 abuts on this upper end, as shown in FIG. 18. Therefore, when the pin 124-3 is biased downward by the inclined cam 127-2, the biasing plate 124-2 rotates around the pin 124-1 as an axis, and the upper end of the biasing plate 124-2 biases one end of the torsion spring 128 forward.

It should be noted that both ends of the torsion spring 128 abut on the clamp arm 124 at normal times, and the biasing force does not act. However, as described above, when one end of the torsion spring 128 is biased forward by the upper end of the biasing plate 124-2, the torsion spring 128 biases the rear end of the clamp arm 124 so as to rotate clockwise around the pin 124-1 shown in FIG. 17B as a bearing, thus the clamp arm 124 rotates so that the damper 125 is pressure-bonded to the turning table 123.

Furthermore, as shown in FIG. 13C, a lifting section 138-2 abuts on the left end of the clamp arm 124 in accordance with sliding movement of the pick swing cam plate 138, whereby the lifted section 124-6 which is biased so that the clamp arm 124 is rotates upward. It should be noted that a light spring 120-6 is attached between the clamp arm 124 and the drive chassis 120, whereby the clamp arm 124 is biased downward. However, when the disk passes through, i.e. when the disk is inserted or ejected, the clamp arm 124 is pushed upward by the lifting section 138-2, and a required space is secured between the damper 125 and the turning table 123 so that the disk D passes therethrough.

[7. Floating Lock Mechanism (FIGS. 19, 20)]

Figure 19:
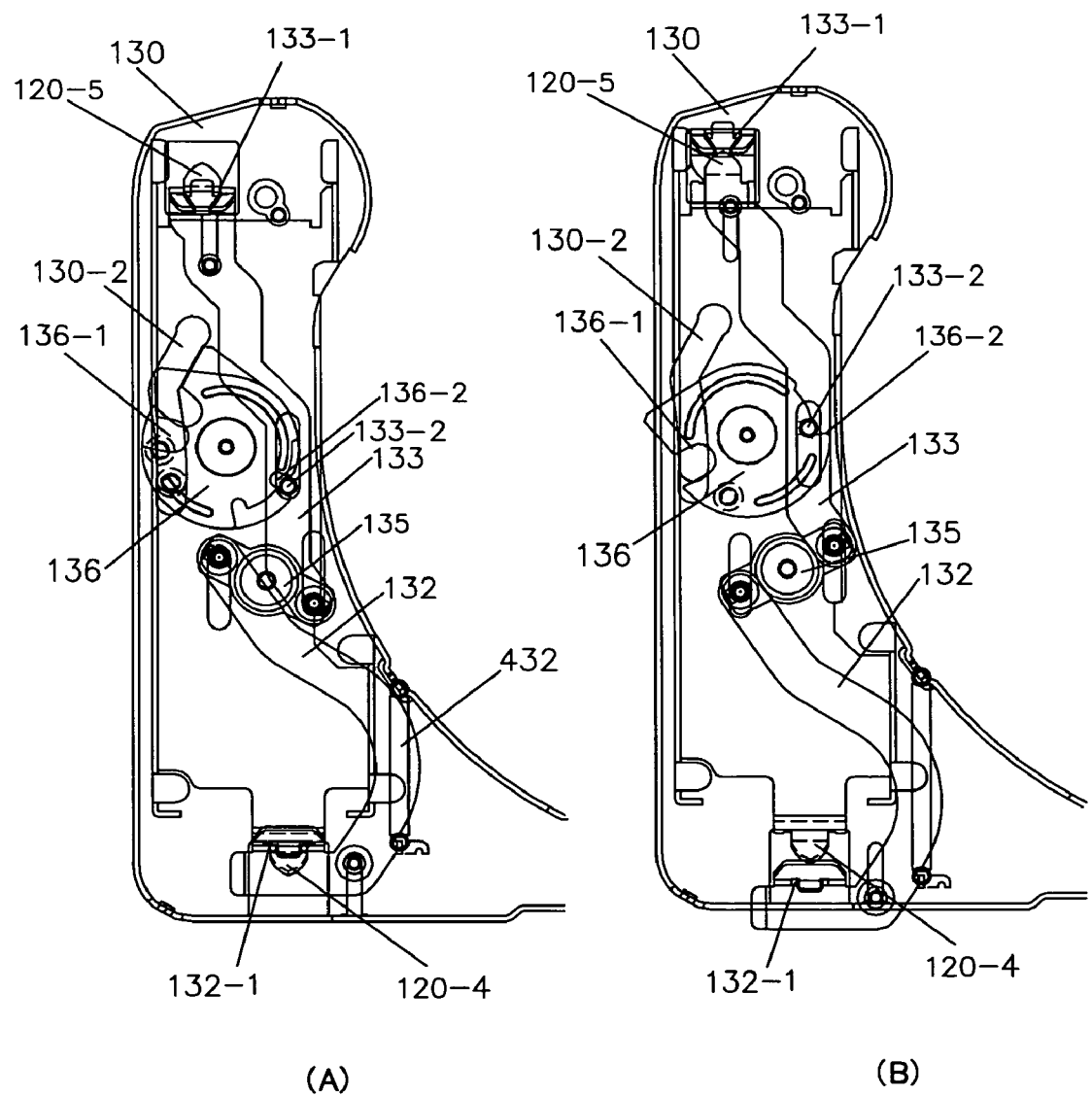
FIG. 19A is a plan view showing a locked state of a floating lock mechanism of the disk device shown in FIG. 1.
FIG. 19B is a plan view showing a lock cancellation state of the floating lock mechanism of the disk device shown in FIG. 1.

Next, the floating lock mechanism is configured by the following members operated by the control plate 136 which is pivotally supported so as to be rotatable around the pick arm 130. Specifically, as shown in FIG. 19, floating lock plates 132, 133 slidably provided on the pick arm 130. These floating lock plates 133, 132 are connected to each other via a link arm 135 provided rotatably on the pick arm 130 so as to be able to slidingly move in directions opposite to each other. As shown in FIG. 20, on end sections which are opposite to each other in the floating lock plates 132, 133, there are formed lock holes 132-1, 133-1 for switching between a lock state and a floating state of the drive chassis 120 by being detachable with respect to lock nibs 120-4, 5 formed at front and back of the drive chassis 120.

Moreover, the floating lock plate 132 is biased in a direction in which the lock nib 120-5 is engaged with the lock hole 132-1 (locking direction), by a spring 432 (the biasing member described in the claims) provided between the floating lock plate 132 and the pick arm 130. Accordingly, the floating lock plate 133, which is connected to the floating lock plate 132 via the link arm 135, is also biased in a direction in which the lock nib 120-4 is engaged with the lock hole 133-1 (locking direction). Therefore, at the time of locking, side faces of the drive chassis 120 which are opposite to each other are sandwiched by the floating lock plates 132, 133.

Cam grooves 136-1, 136-2 are formed on the control plate 136 provided rotatably between the floating lock plates 132, 133. The cam groove 136-1 is engaged with the two-stage roller 131-3 in accordance with rotation of the pick swing arm 131 (see FIG. 6). The cam groove 136-2 is engaged with a pin 133-2 provided on the floating lock plate 133 in accordance with rotation of the control plate 136, and biases the floating lock plate 133 in a direction opposite to the locking directions (floating direction). When the floating lock plate 133 is biased in the floating direction in this manner, the floating lock plate 132 to which the floating lock plate 133 is connected via the link arm 135 also moves to the direction opposite to the locking direction (floating direction). It should be noted that the locking direction and the floating direction are opposite to each other in the floating lock plate 133 and the floating lock plate 133.

[8. Tray (FIGS. 1, 2)]

Various known technologies can be applied to the trays 250 in which the disks D are housed and which are split when playing a disk D. For example, it is considered that the trays 250 can be provided as arc-like plates which are stacked on the pick chassis 110 and capable of moving up and down, a rotating drum cam 210 is disposed upright a shown in FIG. 1 and FIG. 2, and nib sections which are provided on an edge of the tray 250 are inserted in a step-like groove formed on the periphery of the drum cam 210, whereby the tray 250 moves up and down in accordance with the rotation of the drum cam 210.

[9. Drive Mechanism]

Figure 21:
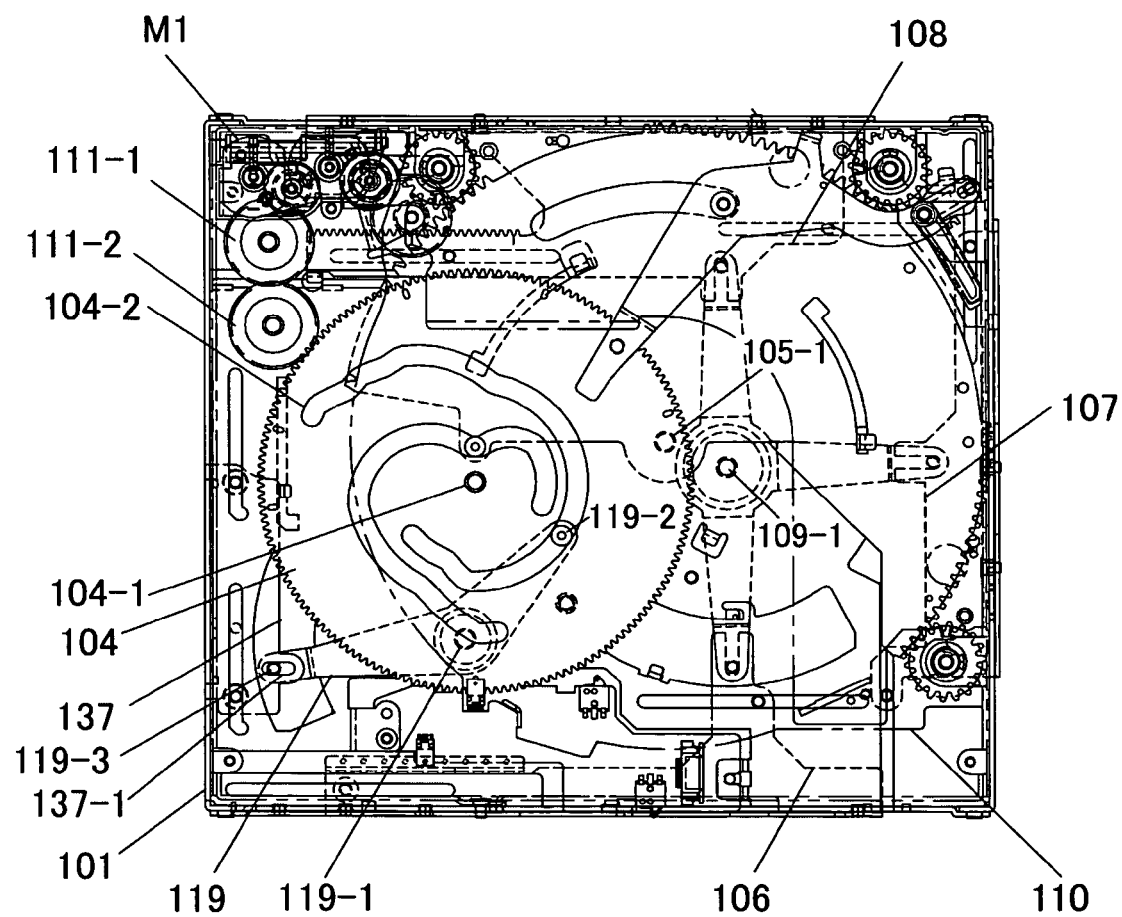
FIG. 21 is a plan view showing a drive mechanism of the disk device shown in FIG. 1.

The abovementioned pick swing cam plate 138 and constitutes a drive mechanism for rotating the pick swing arm 131 and the pick arm 130 in accordance with the sliding movement thereof and consecutively operating the disk clamping mechanism and the floating lock mechanism. As the drive mechanism, various known technologies can be applied. For example, as shown in FIG. 21, the following configuration is considered in which the pick swing cam plate 138 is slidingly moved by a combination of a motor Ml, speed reduction mechanism, spur gears 111-1, 111-2, circular cam plate 104, link plate 119, and slide plate 137. Specifically, the motor Ml as a driving source is attached to a left side corner at the back of the chassis 101. The rotary drive power of the motor M1 is transmitted to the spur gears 111-1, 111-2 attached rotatably onto the chassis 101, via the speed reduction mechanism.

Further, the circular cam plate 104, outer periphery of which is formed with a gear groove, is attached to the bottom face of the chassis 101 so as to be able to rotate around the axis 104-1. A swing drive cam 104-2, which is a groove or a hole engaged with a roller 119-2 of the link plate 119, is formed on the circular cam plate 104, the roller 119-2 being described hereinafter. This link arm 119 is attached to an upper part of the bottom face of the chassis 101 so as to be rotatable around an axis 119-1. One end of the link arm 119 is provided with the roller 119-2 rotatably, and the other end is integrated with a pin 119-3. The roller 119-2 is inserted into the swing drive mechanism 104-2.

Figure 22:
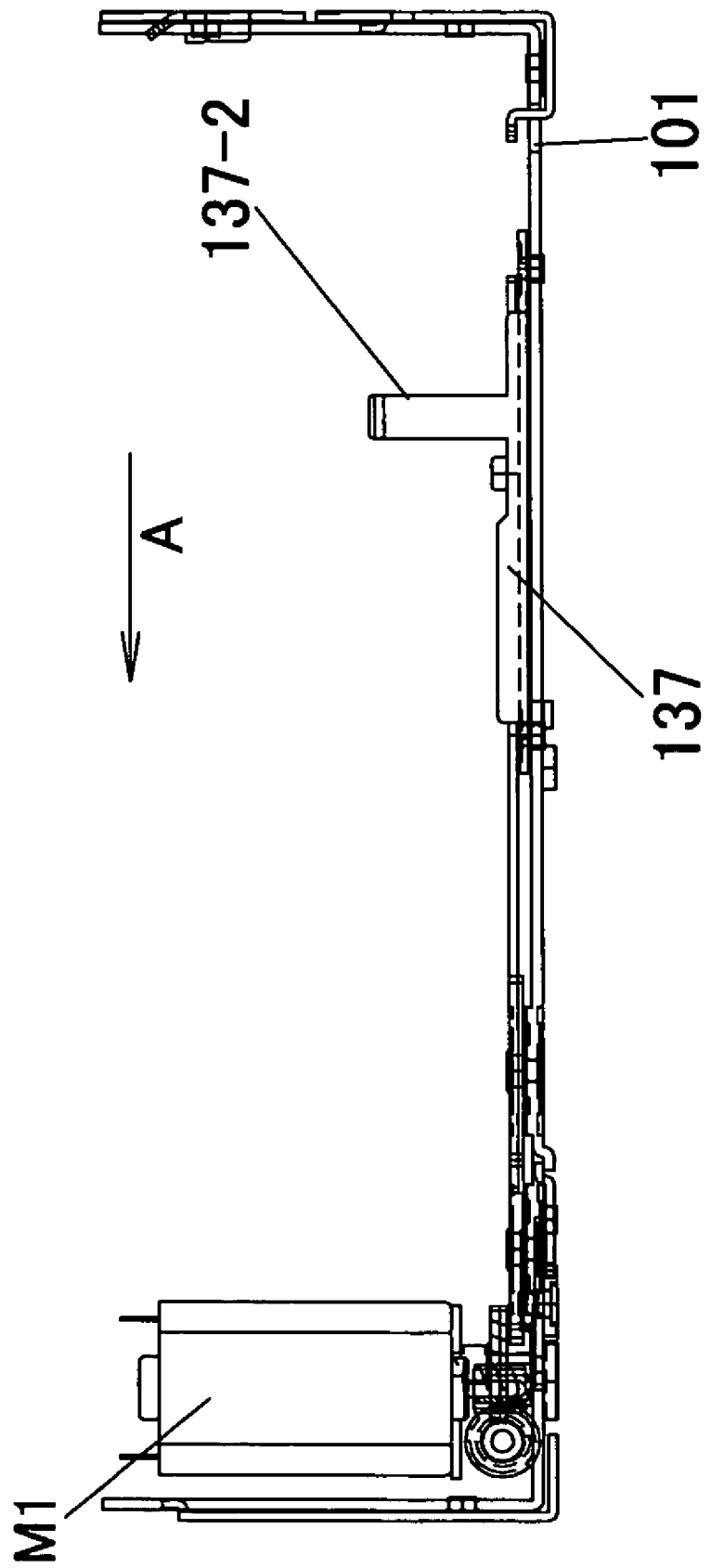
FIG. 22 is a left side view showing the chassis and a slide plate of the disk device shown in FIG. 1.

The slide plate 137 is provided on the left side face of the chassis 101 so as to be able to slidingly move back and forth. The pin 119-3 of the link arm 119 is connected to a connection hole 137-1 provided on the slide plate 137, so as to be able to rotate and move right and left. As shown in FIG. 22, the left side face of the slide plate 137 is provided with an abutting section 137-2 which is caused to stand vertically. This abutting section 137-2 abuts on the pick swing cam plate 138.

The swing drive cam 104-2 which is provided on the circular cam plate 104 is in the form of a continuous meander groove, and the roller 119-2 engaged therewith changes the distance to the axis 104-4 in accordance with rotation of the circular cam plate 104, whereby the link arm 119 and a ring gear 105 are biased. Therefore, when the drive power of the motor M1 is transmitted to the circular cam plate 104 via the speed reduction mechanism and the spur gears 111-1, 111-2, the circular cam plate 104 rotates, at the same time the swing drive cam 104-2 moves, and accordingly the roller 119-2 is biased, whereby the link arm 119 rotates.

Then, the slide plate 137 slidingly moves due to the rotation of the link plate 119, thus up-and-down movement of the pick swing cam plate 138 contacting with the abutting section 137 is permitted and the pick swing cam plate 138 slidingly moves back and forth. It should be noted that the motor M1 is controlled by a microcomputer which is operated by a predetermined program, in response to an input signal from inputting means of operation buttons and the like.

[C. Action]

Regarding the above-described operation of the present embodiment, the overview of the operation of the disk device is described first and then an operation of swinging and inserting the pick arm, a disk clamping operation, a floating lock cancellation operation, an operation for releasing the disk, floating lock operation, and an operation of swinging out the pick arm, are described.

[1. Overview of Operation]

Figure 23:
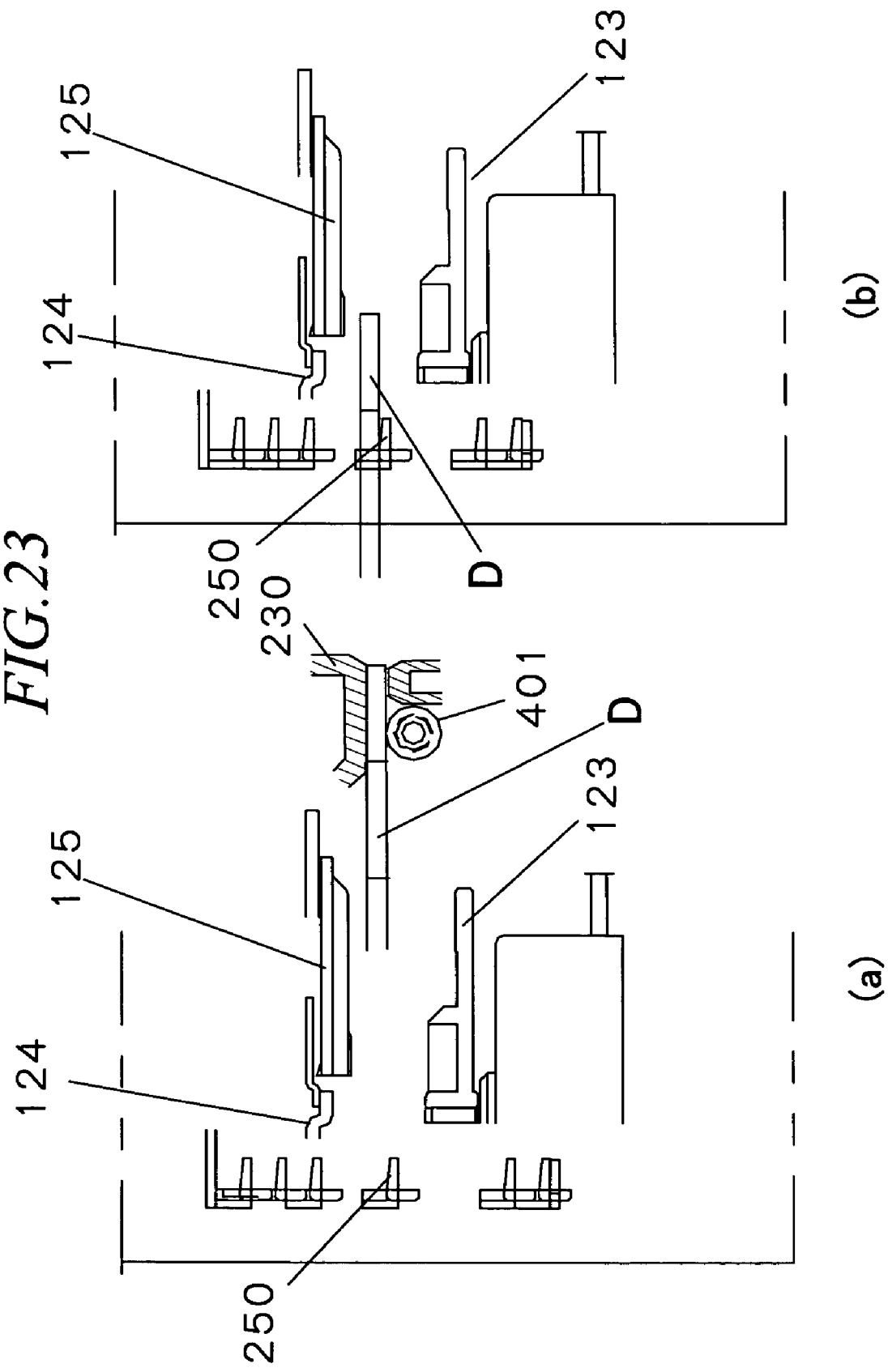
FIG. 23A is an explanatory diagram showing a state in which a disk starts to be inserted in the disk device shown in FIG. 1.
FIG. 23B is an explanatory diagram showing a state in which the disk is pulled out in the disk device shown in FIG. 1.

First, the overview of the operation of the disk device is described with reference to FIG. 23 and FIG. 24. It should be noted that 401 in the figures is a loading roller 401 having a general disk device. Specifically, as shown in FIG. 23A, the disk D, which is inserted from the disk insertion opening 101-7, is pulled in by the loading roller 401, passes through between the clamper 125 and the turning table 123 as shown in FIG. 24B, and is then housed in an upper part of each tray 250. When playing the disk D, trays 250 above and below the tray 250 hosing a desired disk D therein are split and caused to withdraw, as shown in FIG. 24A. The drive chassis 120 is swung and caused to enter a space created by causing the trays 250 to withdraw by rotating the pick arm 130, so that the desired disk D enters between the tuning table 123 and the clamper 125.

Then, as shown in FIG. 24B, the clamp arm 124 is lifted down whereby the disk D is sandwiched between the turning table 123 and the damper 125. Moreover, the disk D is rotated on the turning table 123 by a spindle motor to read the information of the disk D by means of an optical pickup moved by a feed mechanism.

[2. Swinging the Pick Arm]

When swinging the pick arm 130, first the trays 250 above and below the selected tray 250 are split and caused to withdraw. The ring gear 105 is rotated by the circular cam plate 104 which is rotated by an operation of the motor Ml, and the slide plate 137 is slidingly moved backward (A direction in FIG. 22), whereby the pick swing cam plate 138 is slidingly moved backward (A direction in FIG. 6).

Consequently, as shown in FIG. 7, the roller 131-2 is biased by the swing cam 138-1 provided on the pick swing cam plate 138, and the pick swing arm 131 rotates clockwise. The two-stage roller 131-3 of the pick swing arm 131 moves along the connecting cam 130-2 of the pick arm 130, thus the pick arm 130 rotates counterclockwise. The rotation of the pick arm 130 is facilitated and stabilized by the functions of the pick arm spacer 221 and the plate spring 116. The hook 130-5 at the leading end of the pick arm 130 rotating in this manner is inserted into and held by the holding section 129, and then reaches the rotation end, as shown in FIG. 2. At this moment, the damper 125 and the turning table 123 are brought to the top and bottom of the disk D which is the object of selection.

[3. Disk Clamping]

Moreover, as shown in FIG. 8, when the pick swing cam plate 138 slidingly moves backward and the pick swing arm 131 rotates clockwise, the two-stage roller 131-3 of the pick swing arm 131 moves along the connecting cam 130-2. Consequently, the two-stage roller 131-3 is engaged with the cam groove 136-1 of the control plate 136, thus the control plate 136 starts rotating counterclockwise.

As shown in FIGS. 13A and 13B, the groove 127-3 of the clamp plate 127 is engaged with the pin 136-3 of the control plate 136. Therefore, the clamp plate 127 starts moving slidingly to the right in the figures in accordance with rotation of the control plate 136. Consequently, as shown in FIGS. 14A and 14B, the pin 124-1 of the clamp arm 124 is biased downward by the inclined cam 127-1 of the clamp plate 127, thus the clamp arm 124 moves downward in a vertical direction and the clamper 125 holds the inner diameter of the disk D between the clamper 125 and the turning table 123. Moreover, as shown in FIG. 15, when the control plate 136 rotates counterclockwise, the pin 136-3 is removed from the cam groove 127-3 of the clamp plate 127.

In this manner, when the pin 124-3 of the biasing plate 124-2 is biased downward by the movement of the inclined cam 127-2, the upper end of the biasing plate 124-2 biases an end of the torsion spring 128 forward. Since the torsion spring 128 is attached to the clamp arm 124 as described above, the torsion spring 128 is biased so as to rotate clockwise around the pin 124-1 which acts as a spindle. The clamp arm 124, which was disposed in a horizontal state, lightly rotates in a direction in which the clamper 125 pressure-bonds the disk D to the turning table 123, and the pressure is applied to the clamper 125 from the torsion spring 128. It should be noted that the clamp plate 127 is held by the spring 500 in the direction of pressure-bonding the disk, thus the direction is prevented from being reversed in a floating state, which is described hereinafter.

[4. Floating Lock Cancellation]

Subsequently to the above-described disk clamping operation, cancellation of floating lock is performed. Specifically, as shown in FIG. 8, when the pick swing arm 131 and the control plate 136 are rotated by the sliding movement of the pick swing cam plate 138, the pin 133-2 of the floating lock plate 133 is brought into engagement with the cam groove 136-2 of the control plate 136, and the floating lock plate 133 slidingly moves to in a floating direction.

On the other hand, the floating lock plate 132, which is connected to the floating lock plate 133 via the link arm 135, also slidingly moves in the floating direction. Accordingly, as shown in FIG. 19B and FIG. 20B, the lock nibs 120-4, 5 of the drive chassis 120 are released by the lock holes 133-1, 132-1, thus, as shown in FIG. 16B, the drive chassis 120 enters the floating state in which the drive chassis 120 is supported only by the damper 121 and the coil spring 122.

[5. Playing the Disk]

When the disk D, which is pressure-bonded onto the turning table 123 as described above, is released by the tray 250 moving downward, the tray 250 holding the disk D, the disk D is rotated by the spindle motor M3 and the pick up unit is scanned by the feed mechanism, whereby the information recorded on the disk D is read. After completion of playing the disk, when the disk D is brought back to the tray 250, an operation, which is the reverse of the abovementioned operations, is carried out, whereby the disk D is brought to the floating lock state and released from the turning table 123, and the pick arm 130 is swung out from between the trays 250. The procedure of this operation is as follows.

[6. Floating Lock and Release of the Disk]

After completion of playing the disk, when the tray 250 moves upward to hold the disk D and the pick swing cam plate 138 is slidingly moved forward (direction opposite to A direction in the figure) by the operation of the motor Ml as shown in FIG. 8 and FIG. 7, the roller 131-2 is biased by the swinging cam 138-1, and the pick swing arm 131 rotates counterclockwise. The two-stage roller 131-3 of the pick swing arm 131 moves along the connecting cam 130-2 of the pick arm 130. Therefore, the control plate 136 in which the two-stage roller 131-3 is engaged with the cam groove 136-1 rotates clockwise.

In accordance with the rotation of the control plate 136, the pin 133-2 which is engaged with the cam groove 136-2 is biased and the floating lock plate 132 slidingly moves in a lock direction. Further, the floating lock plate 132, which is connected to the floating lock plate 133 via a link arm 139, also slidingly moves in the lock direction.

Accordingly, as shown in FIG. 19A and FIG. 20A, the lock holes 133-1, 132-1 are engaged with the lock nibs 120-4, 5 of the drive chassis 120 respectively, whereby, as shown in FIG. 16A, the damper 121 and the coil spring 122 are compressed and the drive chassis 120 enters the lock state in which the drive chassis 120 is fixed on the pick chassis 110. Then, when the control plate 136 further rotates, the pin 133-2 of the floating lock plate 133 is removed from the cam groove 136-2, as shown in FIG. 7. At this moment, since the bias force of the spring 432 is added, the floating lock plates 132, 133 are prevented from being unstable.

Further, as shown in FIG. 14, since the pin 136-3 of the control plate 136 is engaged with the groove 127-3 of the clamp plate 127 in accordance with the rotation of the control plate 136, the clamp plate 127 starts to slidingly move (to the left in FIG. 14), and the pin 124-3 is biased by the inclined cam 127-2. Accordingly, the biasing plate 124-2 rotates and an upper end thereof separates from one end of the torsion spring 128, thus the biasing plate 124-2 and the clamp arm 124 are integrated. At this moment, the inclined cam 127-1 also biases the pin 124-1 of the clamp arm 124 upward, thus the clamp arm 124 moves up in the vertical direction. Therefore, as shown in FIG. 13B, the clamper 125 releases the inner diameter of the disk D. It should be noted that the released disk D is held on the tray 250 side.

[7. Swinging and Ejecting the Pick Arm]

Moreover, when the pick swing cam plate 138 slidingly moves forward and the pick swing arm 131 rotates counterclockwise, the two-stage roller 131-3 of the pick swing arm 131 moves along the connecting cam 130-2 of the pick arm 130 and the pick arm 130 starts rotating clockwise. Accordingly, the hook 130-5 at the leading end of the pick arm 130 is removed from the holding section 129, and the clamper 125 and the turning table 123, which already released the top and bottom of the disk D as described above, move in a direction in which the pick arm 130 is swung out of the trays 250 while the pick arm 130 rotates, and return to the initial state and then are stopped.

In the case of keep the played disk D housed, the trays 250 move in a direction in which they become close to each other, and then return to the housing state. In the case of ejecting the disk D, the pick chassis 110 moves downward to the lowest section and stands by, and the selected disk D is positioned at the disk insertion opening 101-7 provided on the front face of the chassis 101, by a group of trays 250 being moved up and down by the rotation of the drum cam 210 (see FIG. 5), and the disk D is ejected from the tray 250 by the loading roller 401. It should be noted that, when the disk D is inserted/ejected, the pick swing cam plate 138 moves, whereby, as shown in FIG. 1 and FIG. 13C, the lifting section 138-2 thereof lifts up the lifted section 124-6 of the clamp arm 124, and a required clearance is secured between the clamper 125 and the turning table 123.

[D. Effect]

According to the present embodiment described above, an operation of swinging the swing arm 130 performed by the drive mechanism including the pick swing cam plate 138, an operation of disk clamping by means of the up-and-down movement of the clamp arm 124, and an operation of floating lock cancellation performed by the movement of the floating lock plates 132, 133 can be sequentially performed, and also the operations in the opposite pattern can be continuously and smoothly carried out by the single control plate 136, thus the configuration of the device can be made extremely simple.

Particularly, after the operation of swinging the pick swing arm 131 is completed, the connecting cam 130-2 biases the control plate 136, and before the operation of swinging the pick swing arm 131 is performed, the bias to the control plate 136 is canceled, thus erroneous operation, such as lock cancellation before swinging-in and unlocking after swinging-out, can be securely prevented from occurring. Further, the control plate 136 rotates and thereby operates the disk clamping mechanism and the floating lock mechanism, thus the continuous operation can be realized with a small space required.

The floating plates 132, 133, which are biased by the control plate 136, are also a pair of plates which slidingly move and thereby shift between the lock state and the floating state, thus locking and lock cancellation ca be securely realized with the simple mechanism. Particularly, since the floating lock plates 132, 133 are connected to each other via the link arm 139, one of them can be driven by driving the other one. Therefore, the floating lock plates 132, 133 are suitable to be driven by the single control plate 136. Moreover, since the floating lock plates 132, 133 are biased to the lock position by the spring 432, the floating lock plates 132, 133 are prevented from being unstable at the time of locking.

The clamp plate 127, which is biased by the control plate 136, can slidingly move and thereby shift between the disk clamping state and the disk releasing state, thus disk clamping can be carried out securely with the simple mechanism. Further, the hook 130-5 of the swung-in pick arm 130 is held by the held section 129 in the chassis 101, thus it is possible to realize a disk device in which the drive unit can obtain high resistance to vibration. Therefore, a device which is suitable for, for example, an on-board disk device can be configured.

Three points on the drive chassis 120 having the drive unit are supported by the double structure having a combination of the damper 121 and the coil spring 122, thus high vibration absorbency can be obtained even if the space on the pick arm 130 is narrow. Particularly, one combination of damper 121 and coil spring 122 is disposed on the position separated from the turning table 123 in the drive unit (leading end side of the pick arm 130), thus the narrow space can be utilized effectively to realize a stable support. Furthermore, since the coil spring 122 is in the form of a barrel as shown in FIG. 16, it can be stretched widely in not only the vertical direction but also in the horizontal direction, thus the vibration absorbency further improves.

In addition, the pick arm spacer 221 for facilitating the rotation of the pick arm 130, and the plate spring 116 for biasing the pick arm 130 to the pick chassis 110 side are provided in the vicinity of the axis 130-1 of the pick arm 130, whereby a stable rotation with no blurring can be realized without requiring a long axis, thus the floating lock device with a reduced-size and simple structure requiring a small space can be obtained. Particularly, pressure for biasing the pick arm 130 to the pick chassis 110 can be made even by the circular plate spring 116, thus more stable rotation can be realized. Further, the pick arm 130 can be driven by the pick swing arm 131 rotating in parallel with the pick arm 130, thus the rotation can be further stabilized, and the space in the height direction can be prevented from being enlarged.

[E. Other Embodiment]

The present invention is not limited to the abovementioned embodiment. For example, the mechanism for moving the tray up and down, the drive mechanism for rotating the pick arm, the floating lock mechanism, the disk clamping mechanism, and the like are not limited to the ones described in the above embodiment. Furthermore, the configurations of the floating lock mechanism and the disk clamping mechanism are not limited to the examples described in the above embodiment as long as they can be driven by the control plate which is the transmitting member.

Moreover, each member, the number of members, positions for disposing the members, intervals between the members, distance between the operating members and the like are also arbitrary. For example, the spring for biasing the pair of floating lock plates may be provided so as to bias either one of the pair or both. Various known materials, such as rubber or other resin, and a material for sealing viscous fluid by means of the resin, can be applied as the damper which is used as the elastic member. The shape of the coil spring is not always limited to a barrel. The supported locations on the elastic member may be more than three. In addition, elastic members at two or more locations may be separated from the drive unit.

Also, as the spacer, various known materials apply as long as it can realize facilitation of rotation of the pick arm, thus the shape of the spacer is not limited to the example described in the above embodiment. Further, by configuring the entire or part of the pick arm with a member having a smooth surface, the structure of the pick arm can be obtained by integrating the spacer and the pick arm. The shape of the plate spring also is not limited to the example described in the above embodiment, thus the material is arbitrary.

Although the present invention is suitable for a disk device handling a CD, DVD, or the like, the present invention is not limited to this device, and thus can be applied widely to a flat recording medium. In addition, although the present invention is suitable for an on-board disk device since it is resistant to vibration, the present invention is not limited to this device, and thus can be applied to various disk devices of stand-alone type, portable type, and the like.

The invention claimed is:

1. A floating lock device, comprising:
   a swing arm which can be swung into and swung out of a space created by splitting disk housing sections capable of housing a plurality of disks;
   a drive chassis which is mounted on the swing arm and which comprises a drive unit for playing the disk; and
   a floating lock mechanism which is provided on the swing arm and switches between a floating state in which the drive chassis is supported by an elastic member only, and a lock state in which the drive chassis is fixed to the swing arm;
   a drive mechanism which drives the swing arm; and
   the swing arm is provided with a transmitting member which transmits drive power of the drive mechanism to the floating lock mechanism so as to continuously perform shifting from an operation of swinging-in the swing arm to one operation of the floating lock mechanism or from an operation of swinging-out the swing arm to an other operation of the floating lock mechanism, wherein the drive mechanism has an auxiliary arm which rotates and thereby biases the swing arm in a swing-in direction and a swing-out direction, the transmitting member is provided rotatably by being biased by an end section of the auxiliary arm.

2. The floating lock device according to claim 1, wherein the floating lock mechanism has a pair of floating lock plates which are provided so as to be able to slidingly move between a lock position for engaging with the drive chassis and a floating position for separating from the drive chassis, in accordance with displacement of the transmitting member, the pair of floating lock plates being provided so as to be able to slidingly move in directions opposite to each other by means of a link arm provided rotatably on the swing arm.

3. The floating lock device according to claim 2, wherein the swing arm is provided with a biasing member which biases at least one of the pair of floating lock plates to the lock position.

4. The floating lock device according to claim 1, wherein the drive unit has a turning table on which a disk is mounted, and a disk clamping mechanism which holds the disk between the disk clamp mechanism and the turning table, and the swing arm is provided with a transmitting member which transmits drive power of the drive mechanism to the disk clamping mechanism so as to continuously perform shifting from an operation of swinging-in the swing arm to one operation of the floating lock mechanism and disk clamping mechanism or from an operation of swinging-out the swing arm to the other operation of the floating lock mechanism and disk clamping mechanism.

5. The floating lock device according to claim 4, wherein the floating lock mechanism has a floating lock plate which is provided so as to be able to slidingly move between a lock position for reducing the height of the elastic member by biasing the drive chassis to the swing arm side, and a floating position for recovering the height of the elastic member by canceling the bias on the drive chassis, in accordance with displacement of the transmitting member.

6. The floating lock device according to claim 4, wherein the disk clamping mechanism comprises:
   a damper which holds a disk between the clamper and the turning table;
   a clamp arm to which the clamper is attached and which is provided so as to be able to move up and down; and
   a clamp plate which is provided so as to be slidingly moved by the transmitting member and, in accordance with the sliding movement, biases the clamp arm in a direction of moving the clamp arm up and down.

7. The floating lock device according to claim 4, provided in a chassis, the chassis being provided with a holding section which holds an end section of the swing arm which is swung-in.

8. The floating lock device according to claim 1, wherein the elastic member comprises a combination of a damper and a coil spring, and at least three locations on the drive chassis are supported on the swing arm by the elastic member.

9. The floating lock device according to claim 8, wherein the elastic member on at least one location is disposed on a position which is further away from the drive unit than other elastic members.

10. The floating lock device according to claim 8, wherein the coil spring is in the form of a barrel.

11. The floating lock device according to claim 1, further comprising:
   a supporting body which supports the swing arm rotatably around an axis; and
   biasing means for biasing the swing arm to the supporting body in the vicinity of the axis,
   wherein a spacer for facilitating rotation of the swing arm is sandwiched between the swing arm and the supporting body in the vicinity of the axis.

12. The floating lock device according to claim 11, wherein the biasing means is a circular plate spring.

13. A floating lock device, comprising:
   a swing arm which can be swung into and swung out of a space created by splitting disk housing sections capable of housing a plurality of disks;
   a drive chassis which is mounted on the swing arm and which comprises a drive unit for playing the disk; and
   a floating lock mechanism which is provided on the swing arm and switches between a floating state in which the drive chassis is supported by an elastic member only, and a lock state in which the drive chassis is fixed to the swing arm;
   a drive mechanism which drives the swing arm; and
   the swing arm is provided with a transmitting member which transmits drive power of the drive mechanism to the floating lock mechanism so as to continuously perform shifting from an operation of swinging-in the swing arm to one operation of the floating lock mechanism or from an operation of swinging-out the swing arm to an other operation of the floating lock mechanism, wherein the drive mechanism has an auxiliary arm which rotates and thereby biases the swing arm in a swing-in direction and a swing-out direction, the transmitting member is provided rotatably by being biased by an end section of the auxiliary arm, and the swing arm is provided with a connecting cam which causes the auxiliary arm to bias the transmitting member during a time period between a time after the swing arm is swung-in and a time before the swing arm is swung out.

14. The floating lock device according to claim 13, wherein the floating lock mechanism has a pair of floating lock plates which are provided so as to be able to slidingly move between a lock position for engaging with the drive chassis and a floating position for separating from the drive chassis, in accordance with displacement of the transmitting member, the pair of floating lock plates being provided so as to be able to slidingly move in directions opposite to each other by means of a link arm provided rotatably on the swing arm.

15. The floating lock device according to claim 14, wherein the swing arm is provided with a biasing member which biases at least one of the pair of floating lock plates to the lock position.

16. The floating lock device according to claim 13, wherein the drive unit has a turning table on which a disk is mounted, and a disk clamping mechanism which holds the disk between the disk clamp mechanism and the turning table, and the swing arm is provided with a transmitting member which transmits drive power of the drive mechanism to the disk clamping mechanism so as to continuously perform shifting from an operation of swinging-in the swing arm to one operation of the floating lock mechanism and disk clamping mechanism or from an operation of swinging-out the swing arm to the other operation of the floating lock mechanism and disk clamping mechanism.

17. The floating lock device according to claim 13, wherein the elastic member comprises a combination of a damper and a coil spring, and at least three locations on the drive chassis are supported on the swing arm by the elastic member.

18. The floating lock device according to claim 17, wherein the elastic member on at least one location is disposed on a position which is further away from the drive unit than other elastic members.

19. The floating lock device according to claim 13, further comprising:
   a supporting body which supports the swing arm rotatably around an axis; and
   biasing means for biasing the swing arm to the supporting body in the vicinity of the axis,
   wherein a spacer for facilitating rotation of the swing arm is sandwiched between the swing arm and the supporting body in the vicinity of the axis.

* * * * *